(12) United States Patent
Choi et al.

(10) Patent No.: US 8,863,191 B2
(45) Date of Patent: Oct. 14, 2014

(54) METHOD FOR OPERATING IMAGE DISPLAY APPARATUS

(75) Inventors: Kwangsoo Choi, Seoul (KR); Jongseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 12/970,526

(22) Filed: Dec. 16, 2010

(65) Prior Publication Data

US 2012/0019721 A1      Jan. 26, 2012

Related U.S. Application Data

(60) Provisional application No. 61/367,621, filed on Jul. 26, 2010.

(30) Foreign Application Priority Data

Jul. 26, 2010    (KR) .......................... 10-2010-0071969

(51) Int. Cl.
| | |
|---|---|
| G06F 3/00 | (2006.01) |
| G06F 13/00 | (2006.01) |
| H04N 5/445 | (2011.01) |
| H04N 21/61 | (2011.01) |
| H04N 5/44 | (2011.01) |
| H04N 21/462 | (2011.01) |
| H04N 5/45 | (2011.01) |
| H04N 21/81 | (2011.01) |
| H04N 5/765 | (2006.01) |
| H04N 21/478 | (2011.01) |

(52) U.S. Cl.
CPC ........... *H04N 5/765* (2013.01); *H04N 21/6175* (2013.01); *H04N 5/4403* (2013.01); *H04N 21/4622* (2013.01); *H04N 5/45* (2013.01); *H04N 21/8173* (2013.01); *H04N 5/44543* (2013.01); *H04N 21/47815* (2013.01)

USPC .................. 725/48; 725/39; 725/40; 725/41; 725/42; 725/43; 725/44; 725/45; 725/49; 725/50; 725/51; 725/52; 725/53; 386/297

(58) Field of Classification Search
None
See application file for complete search history.

(56) References Cited

U.S. PATENT DOCUMENTS

| | | | |
|---|---|---|---|
| 6,857,128 B1 * | 2/2005 | Borden et al. .................. | 725/39 |
| 2004/0236865 A1 | 11/2004 | Ullman et al. | |
| 2006/0005222 A1 | 1/2006 | Sato | |
| 2006/0026647 A1 * | 2/2006 | Potrebic et al. ................. | 725/53 |
| 2009/0094197 A1 * | 4/2009 | Fein et al. ......................... | 707/3 |
| 2009/0100361 A1 | 4/2009 | Abello et al. ................. | 715/764 |
| 2009/0307105 A1 * | 12/2009 | Lemay et al. .................. | 705/26 |
| 2011/0158610 A1 * | 6/2011 | Paul et al. ..................... | 386/297 |

FOREIGN PATENT DOCUMENTS

| | | |
|---|---|---|
| EP | 1 427 186 | 6/2004 |
| EP | 1 435 731 | 7/2004 |
| WO | WO 2008/138638 | 11/2008 |
| WO | WO 2009/148781 | 12/2009 |

OTHER PUBLICATIONS

International Search Report dated Aug. 17, 2011.
European Search Report issued in related Application No. 10855389.2 dated Feb. 11, 2014.

* cited by examiner

*Primary Examiner* — Joshua Taylor
(74) *Attorney, Agent, or Firm* — KED & Associates, LLP

(57) ABSTRACT

A multifunctional display device displays a first area containing a program received through a channel, a second area containing card objects, and a third area containing additional information of a downloadable applications selected in association with one of the card objects.

20 Claims, 34 Drawing Sheets

METHOD FOR OPERATING IMAGE DISPLAY APPARATUS

CROSS-REFERENCE TO RELATED APPLICATION

This application claims the benefit of and priority to Korean Patent Application No. 10-2010-0071969, filed on Jul. 26, 2010 in the Korean Intellectual Property Office and to U.S. Provisional Application No. 61/367,621, filed on Jul. 26, 2010, the contents of which are incorporated herein by reference.

BACKGROUND

1. Field

One or more embodiments described herein relate to a display device.

2. Background

Televisions have traditionally displayed content based on received broadcast signals. Recently, consumer demand has prompted an effort to expand the functionality of televisions, computer monitors, mobile terminals and other display devices. This, in turn, requires the development of a user interface that can both display and allow for adjustments in multimedia content for viewing by users.

DETAILED DESCRIPTION

Figure 1:
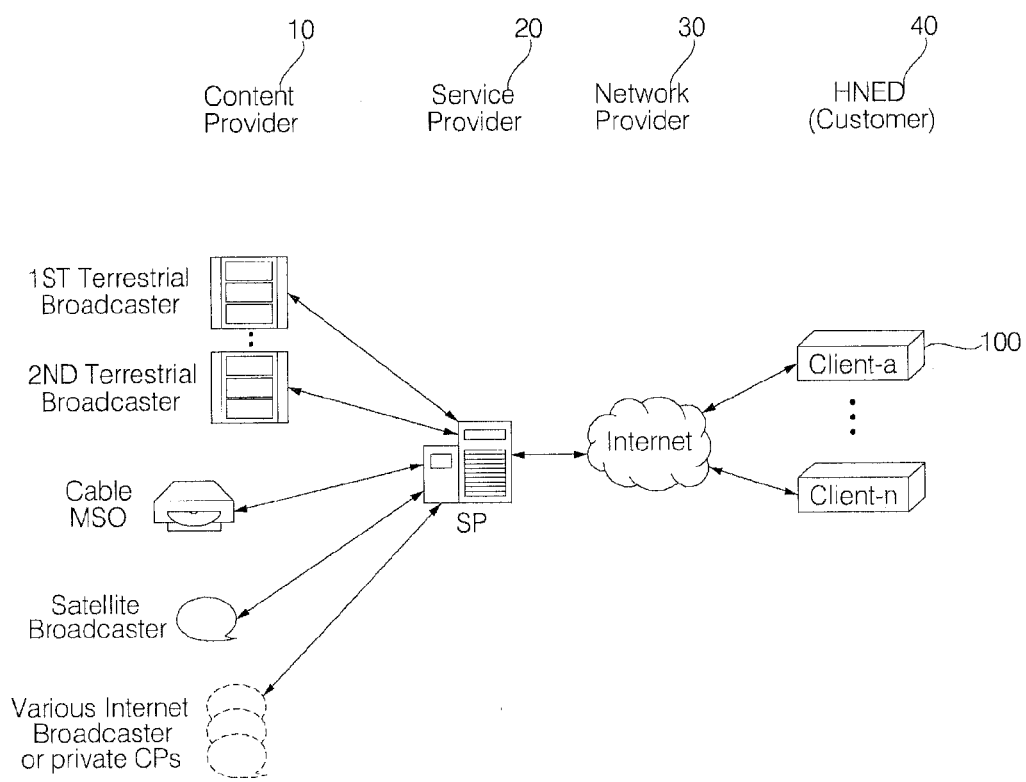
FIG. 1 shows one embodiment of a broadcasting system.

FIG. 1 shows one embodiment of a broadcasting system that includes a Content Provider (CP) 10, a Service Provider (SP) 20, a Network Provider (NP) 30, and a Home Network End Device (FINED) 40. The HNED 40 corresponds to, for example, a client 100 which is an image display apparatus according to one embodiment. As stated before, the image display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network. Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
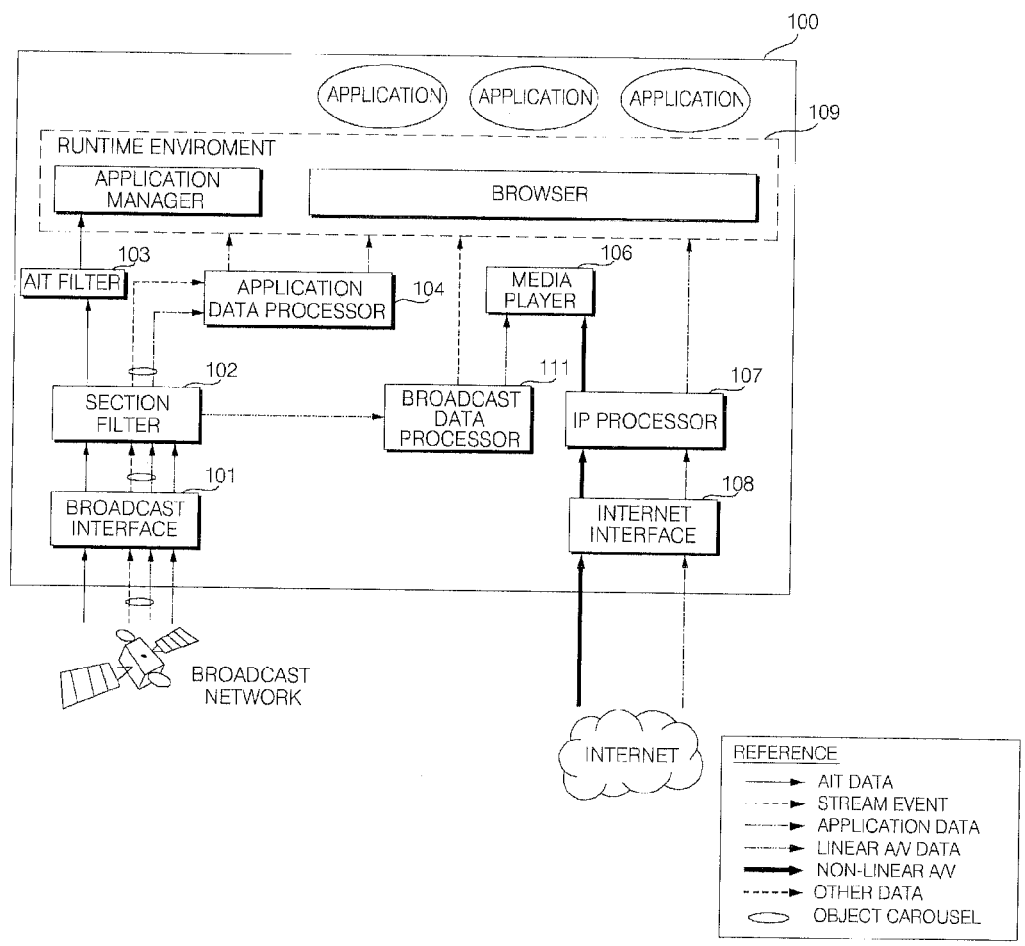
FIG. 2 shows another embodiment of a broadcasting system.

FIG. 2 shows another embodiment of a broadcasting system which includes an image display apparatus 100 connected to a broadcast network and the Internet. The image display apparatus 100 is, for example, a network TV, a smart TV, an HbbTV, etc.

The image display apparatus 100 includes, for example, a broadcast interface 101, a section filter 102, an Application Information Table (AIT) filter 103, an application data processor 104, a broadcast data processor 111, a media player 106, an IP processor 107, an Internet interface 108, and a runtime module 109.

The image display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
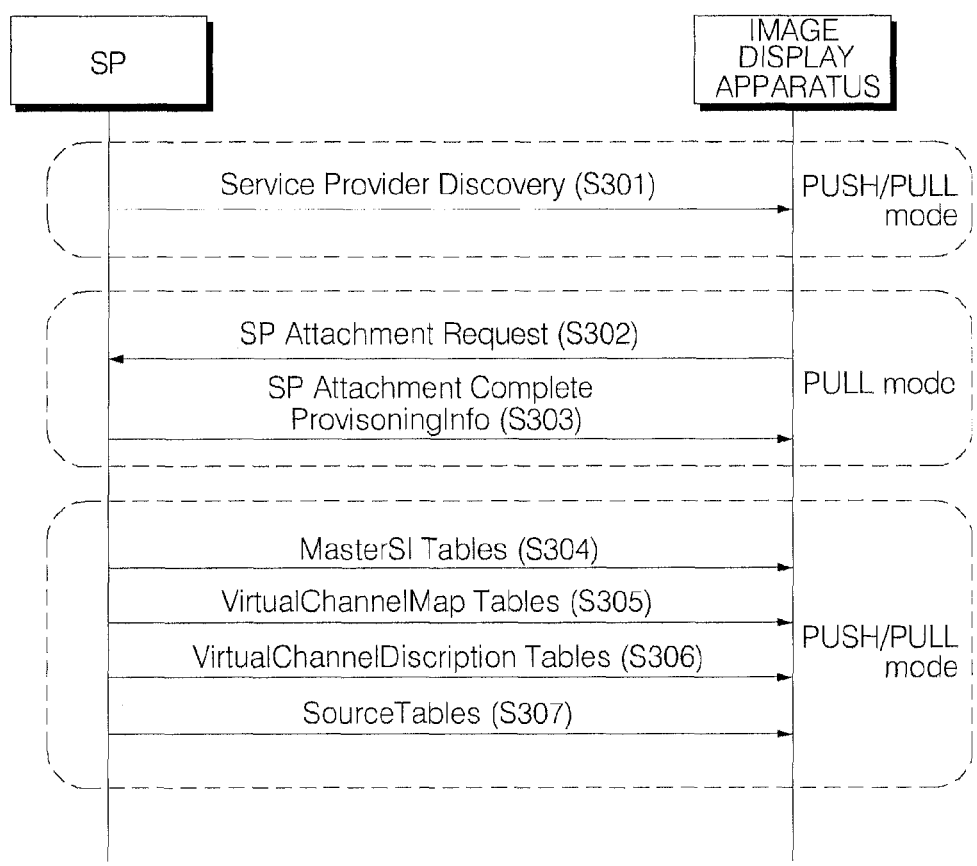
FIG. 3 shows an operation for attaching to a Service Provider (SP) and receiving channel information from the SP in an image display apparatus in FIG. 1 or 2.

FIG. 3 shows an operation for attaching to an SP and receiving channel information from the SP in the image display apparatus illustrated in FIG. 1 or 2. Referring to FIG. 3, an SP performs an SP Discovery operation (S301) and the image display apparatus transmits a Service Provider Attachment Request signal to the SP (S302). Upon completion of attachment to the SP, the image display apparatus receives provisioning information from the SP (S303). Further, the image display apparatus receives Master System Information (SI) Tables, Virtual Channel Map Tables, Virtual Channel Description Tables, and Source Tables from the SP (S304 to S307).

More specifically, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record includes information needed to perform Service Discovery on an SP basis. The image display apparatus then starts a Service Discovery operation using the SP Discovery record. These operations can be performed in a push mode or a pull mode.

The image display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display apparatus may perform a service authentication procedure.

After service attachment is successfully performed, a server may transmit data in the form of a provision information table to the image display apparatus.

During service attachment, the image display apparatus may include an Identifier (ID) and location information thereof in data and transmit the data to the service attachment server. Thus the service attachment server may specify a service that the image display apparatus has subscribed to based on the ID and location information. In addition, the service attachment server provides, in the form of a provisioning information table, address information from which the image display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
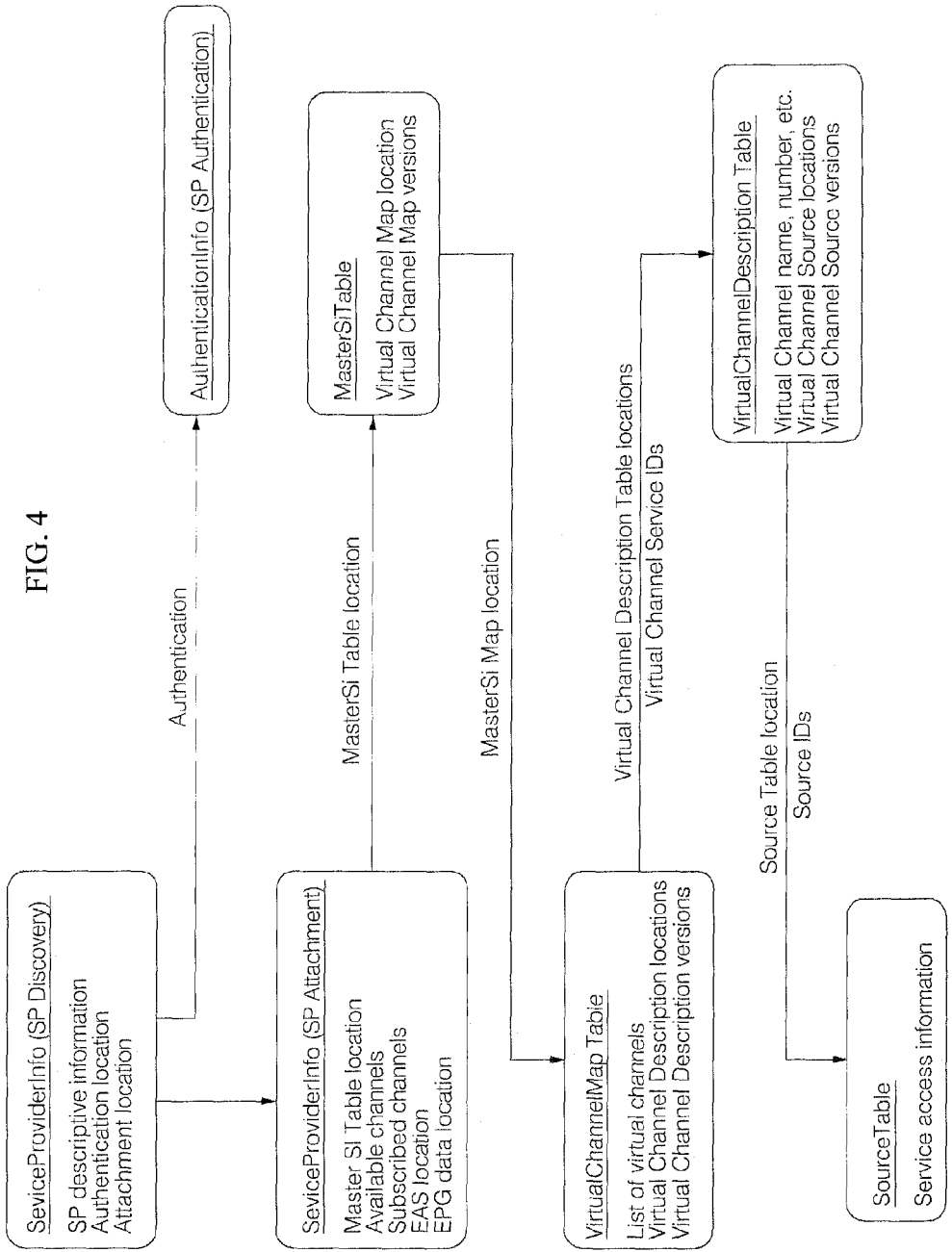
FIG. 4 shows an example of data used in the operation in FIG. 3.

FIG. 4 shows an example of data used in the signal flow in FIG. 3, and also a relationship among data in the SI. Referring to FIG. 4, a Master SI Table contains information about the location and version of each Virtual Channel MAP.

Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus a version change can be monitored by receiving a multicast stream of the Master SI Table.

Figure 5:
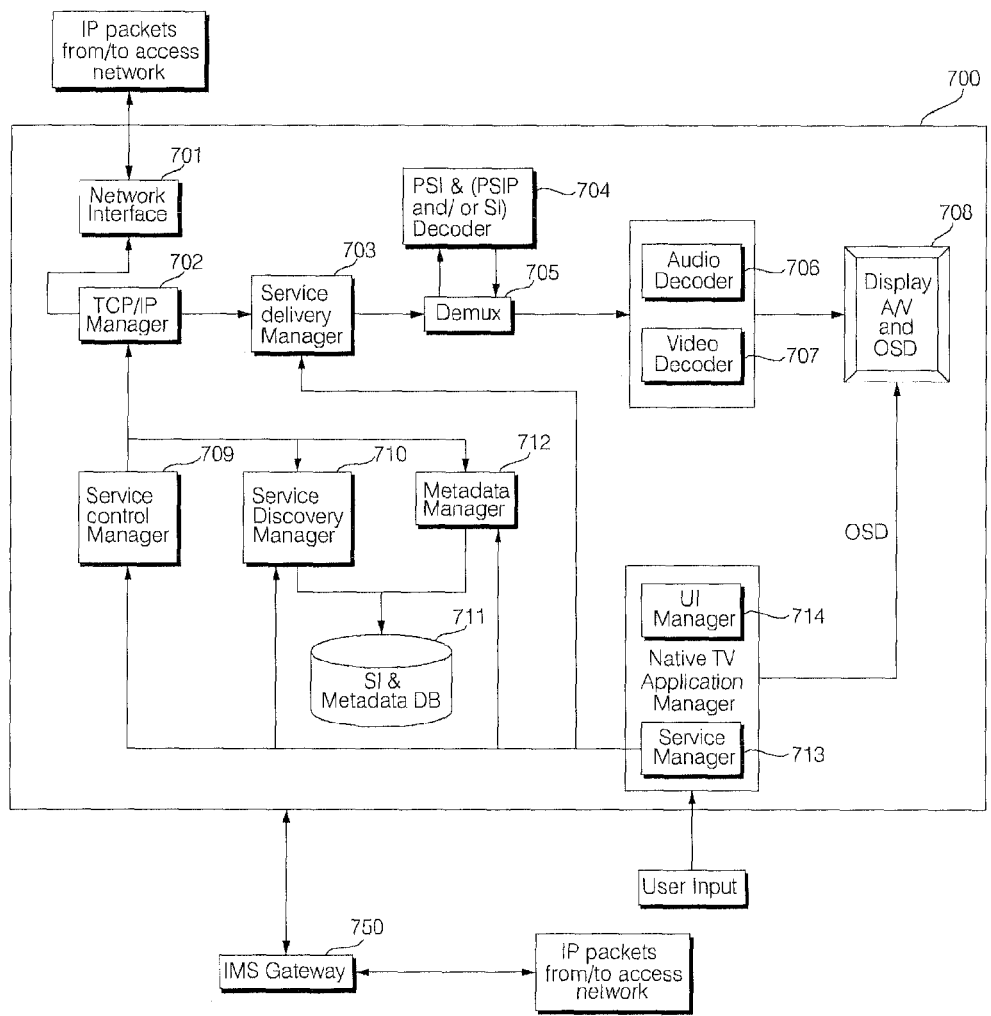
FIG. 5 shows one embodiment of an image display apparatus.

FIG. 5 shows one embodiment of an image display apparatus illustrated in FIG. 1 or 2. The image display apparatus 700 includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display apparatus 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls received service data. For example, when controlling real-time streaming data, the service delivery manager 703 may use the Real-time Transport Protocol/Real-time Transport Control Protocol (RIP/RTCP). If real-time streaming data is transmitted over RTP/RTCP, the service delivery manager 703 parses the received real-time streaming data using RTP and outputs the parsed real-time streaming data to the DEMUX 705 or stores the parsed real-time streaming data in the SI & metadata DB 711 under the control of the service manager 713. In addition, the service delivery manager 703 feeds back network reception information to a server that provides the real-time streaming data service using RTCP.

The DEMUX 705 demultiplexes a received packet into audio data, video data and PSI data and outputs the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 decodes PSI sections, PSIP sections or SI sections received from the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display apparatus 700, provide UIs, and manage other managers.

The UI manager 714 provides a Graphical User Interface (GUI) in the form of an OSD and performs a reception operation corresponding to a key input received from the user. For example, upon receipt of a key input signal regarding channel selection from the user, the UI manager 714 transmits the key input signal to service manager 713.

The service manager 713 controls managers associated with services, such as the service delivery manager 703, the service discovery manager 710, the service control manager 709, and the metadata manager 712.

The service manager 713 also makes a channel map and selects a channel using the channel map according to the key input signal received from the UI manager 714. The service manager 713 sets the audio/video Packet ID (PID) of the selected channel based on SI about the channel received from the PSI & (PSIP and/or SI) decoder 704.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store setup data for the system.

The SI & metadata DB 711 may be constructed in a Non-Volatile RAM or a flash memory.

An IMS gateway 705 is a gateway equipped with functions needed to access IMS-based IPTV services.

Figure 6:
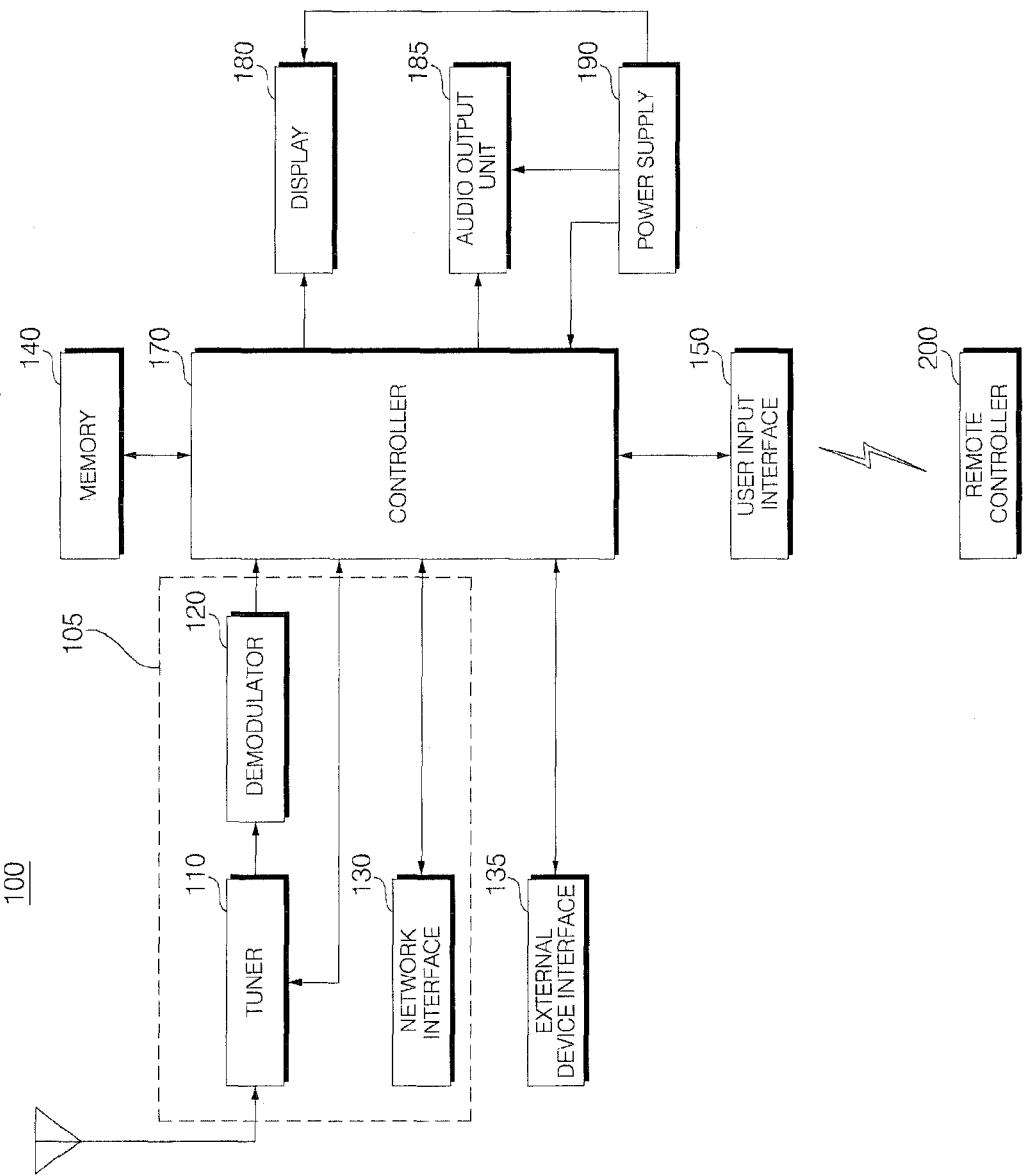
FIG. 6 shows another embodiment of an image display apparatus.

FIG. 6 shows another embodiment of an image display apparatus 100 which includes a broadcasting receiver 105, an external device interface 135, a memory 140, a user input interface 150, a controller 170, a display 180, an audio output unit 185, a power supply 190, and a camera module (not shown). The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit (not shown) and/or a wireless communication module (not shown).

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living NetworkAlliance (DLNA).

The external device interface 135 may be connected to various set-top boxes through at least one of the above-described ports and may thus receive data from or transmit data to the various set-top boxes. The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. The wireless communication module of the external signal I/O unit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

In one embodiment, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130. The memory 140 may store a variety of platforms which will be described later.

In one embodiment, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 is shown in FIG. 6 as configured separately from the controller 170, and the memory 140 may be incorporated into the controller 170, for example.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

Upon receipt of a go-to-home screen input, the controller 170 may control display of the home screen on the display 180. The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list.

The home screen may further include an application menu with at least one application that can be executed. Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of display 180.

Upon receipt of an incoming call at a connected external device or the image display apparatus 100, the controller 170 may control focusing-on or shift of a call-related card object among the plurality of card objects.

If an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In one embodiment, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180 and reception of a selection signal indicating a user terminal selected for use as a user controller from among the listed user terminals through the user input interface 150.

The controller 170 may control output of a game play screen of the game application, inclusive of player information about each user terminal and game play information, through the display 180.

The controller 170 may determine the specific signal received from a user terminal through the network interface 130 as game play information and thus control the game play information to be reflected in the game application in progress.

The controller 170 may control transmission of the game play information about the game application to a specific server connected to the image display apparatus 100 over a network through the network interface 130.

In another embodiment, upon receipt of information about a change in the game play information from the server through the network interface 130, the controller 170 may control output of a notification message in a predetermined area of the display 180.

The image display apparatus 100 may further include a channel browsing processor (not shown) for generating thumbnail images corresponding to channel signals or external input signals.

The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display. The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display apparatus 100 may further include the camera unit (not shown) for capturing images of a user. Image information captured by the camera unit may be input to the controller 170. The controller 170 may sense a user gesture from an image captured by the camera unit or a signal sensed by the sensor unit, or by combining the captured image and the sensed signal.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 7 and 8.

Figure 7:
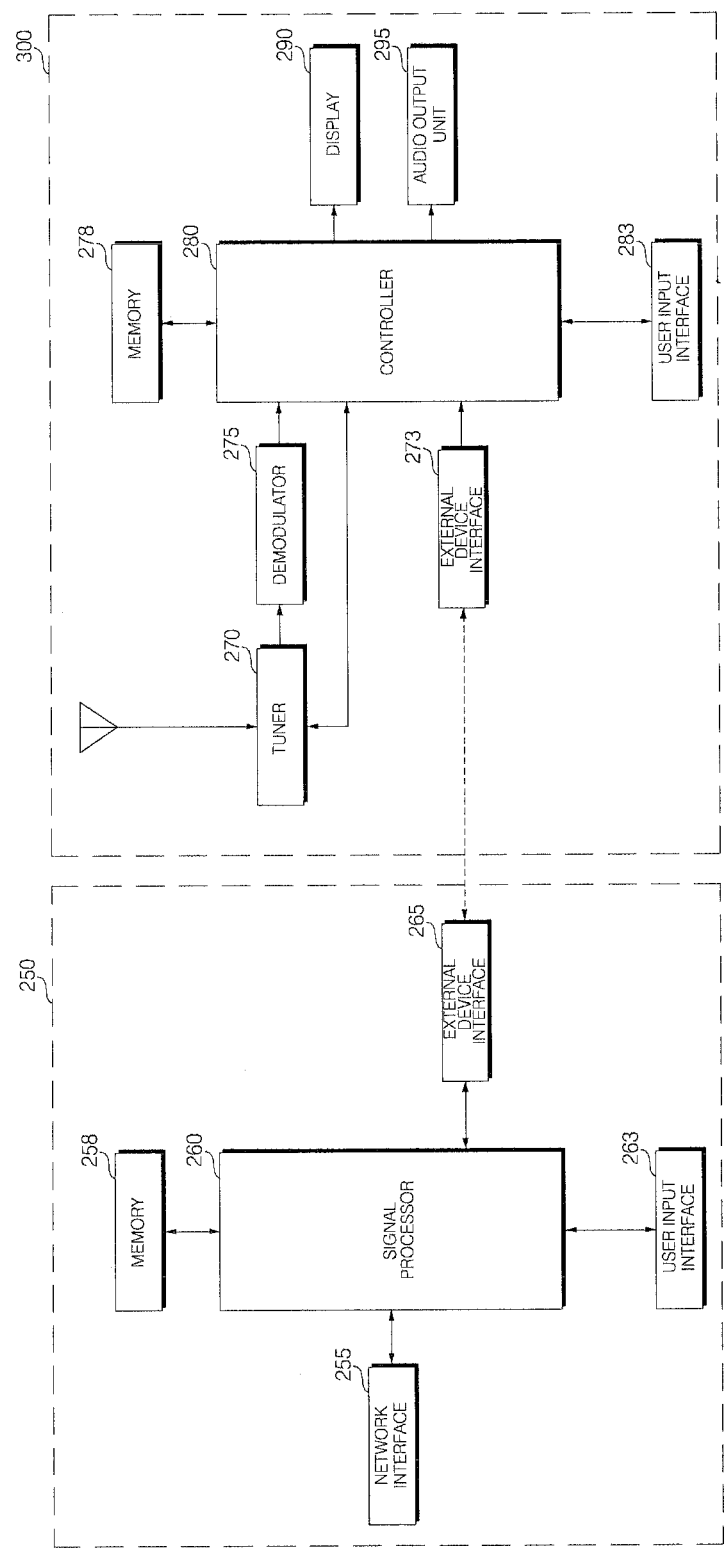
FIGS. 7 and 8 show either of the image display apparatuses separately as a set-top box and a display device.
Figure 8:
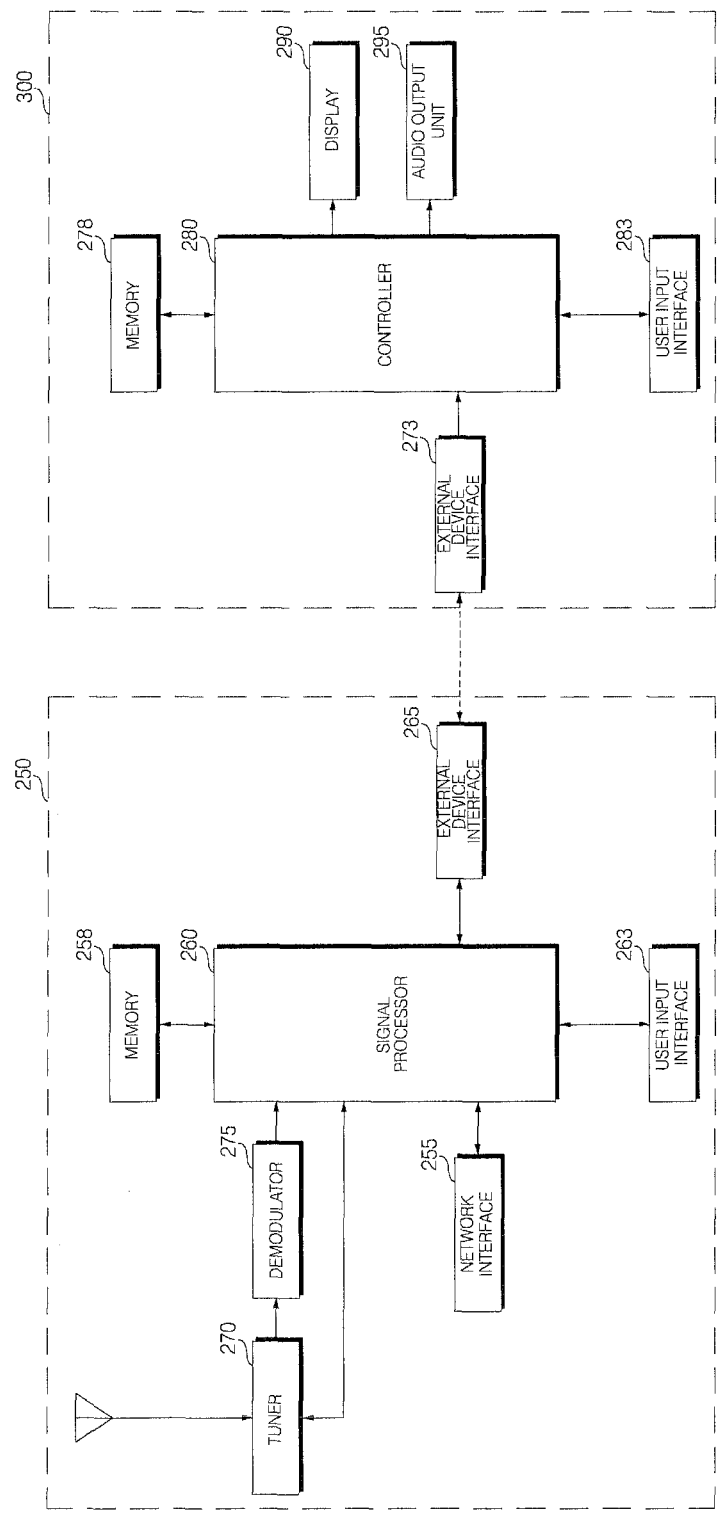

FIGS. 7 and 8 shows that the embodiments of the image display apparatus may be separately provided as a set-top box connected to a display device. Referring to FIG. 7, a set-top box 250 and a display device 300 may transmit or receive data wirelessly or by wire. The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms illustrated in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller 200 and output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception. Hence, a video signal or an audio signal received through the set-top box 250 is output through the display 290 or the audio output unit 295 through the controller 280.

Referring to FIG. 8, the configuration of the set-top box 250 and the display device 300 illustrated in FIG. 8 is similar to that of the set-top box 250 and the display device 300 illustrated in FIG. 7, except that the tuner 270 and the demodulator 275 reside in the set-top box 250, not in the display device 300. Thus the following description is given focusing on such difference.

The signal processor 260 may process a broadcast signal received through the tuner 270 and the demodulator 275. The user input interface 263 may receive a channel selection input, a channel store input, etc.

Figure 9:
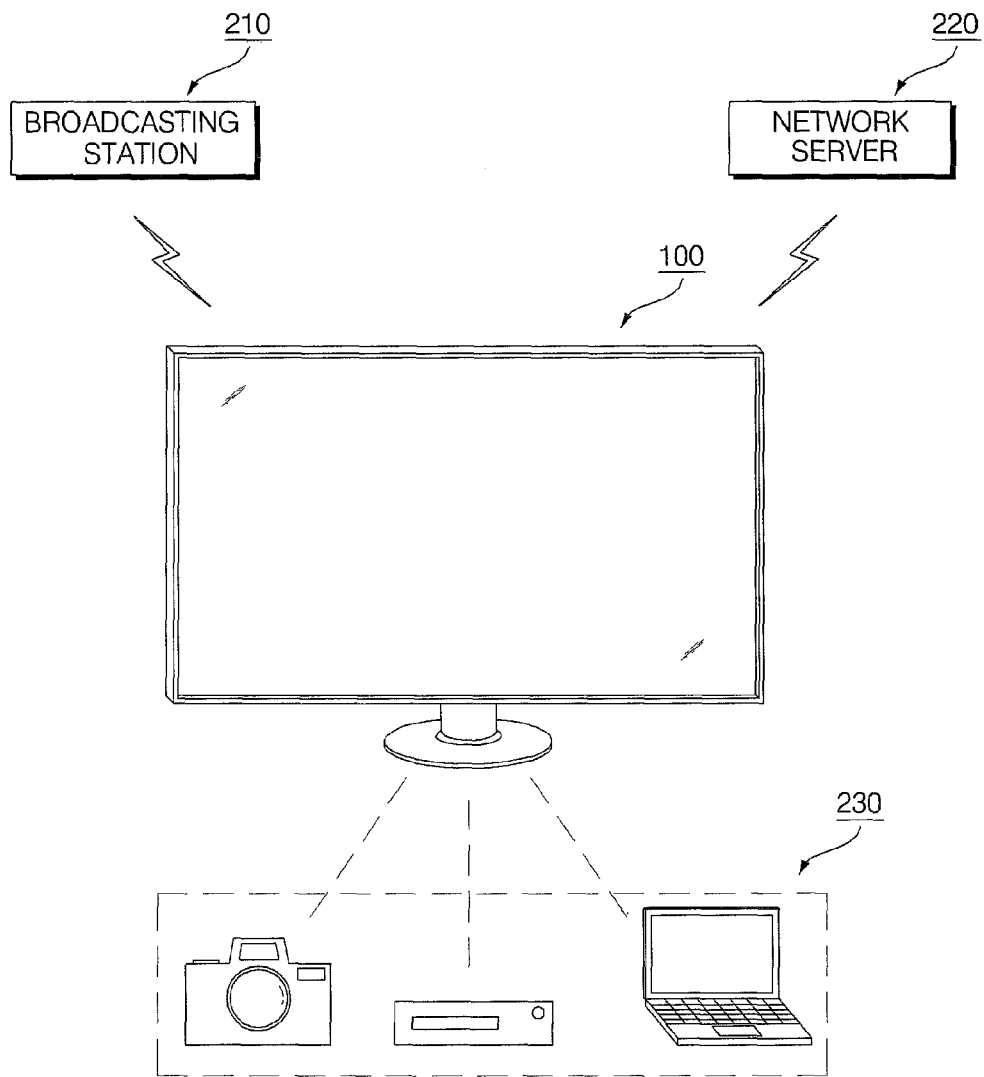
FIG. 9 shows an operation for communicating with third devices in either of the aforementioned image display apparatuses.

FIG. 9 shows an operation for communicating with third devices for the embodiments of the image display apparatuses described herein. Referring to FIG. 9, image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
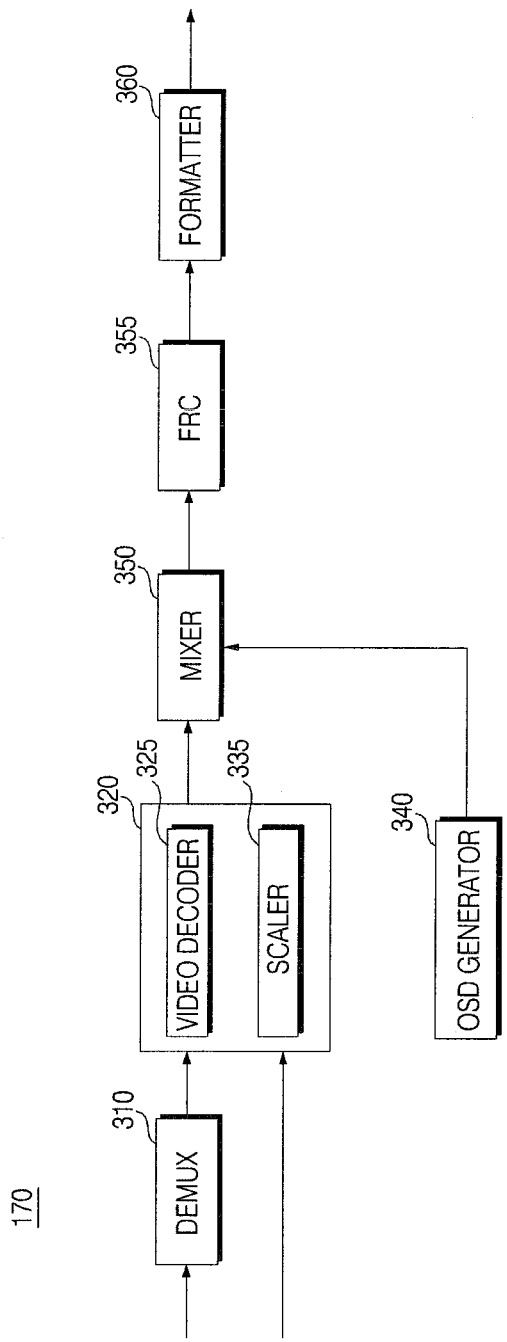
FIG. 10 shows one type of controller that may be included in FIG. 6.

FIG. 10 shows an example of the controller illustrated in FIG. 6. Referring to FIG. 10, the controller 170 may include a DEMUX 310, a video processor 320, an OSD generator 340, a mixer 350, a Frame Rate Converter (FRC) 355, and a formatter 360 according to one embodiment. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards. If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder. The video signal decoded by the video processor 320 is provided to the mixer 350.

The OSD generator 340 generates an OSD signal autonomously or according to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc. For example, the OSD generator 340 may generate a signal by which subtitles are displayed for a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI).

ATSC-PSIP information or DVB-SI may be included in the header of a TS, i.e., a 4-byte header of an MPEG-2 TS.

The block diagram of the controller 170 illustrated in FIG. 10 is but one possible embodiment. Depending upon the specifications of controller 170, the components of the controller 170 may be combined, or omitted. Or new components are added to the controller 170.

Figure 11:
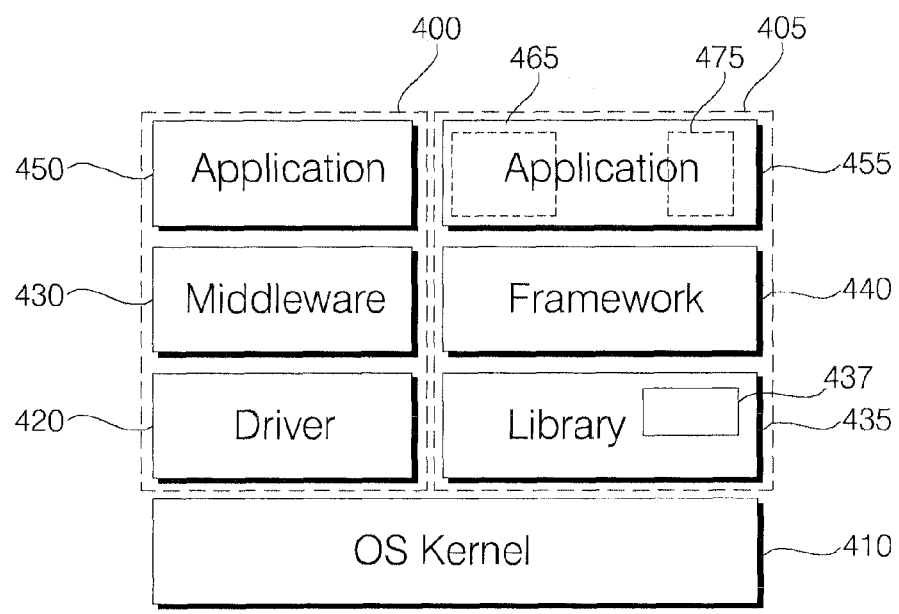
FIG. 11 shows a platform architecture for an image display apparatus.
Figure 12:
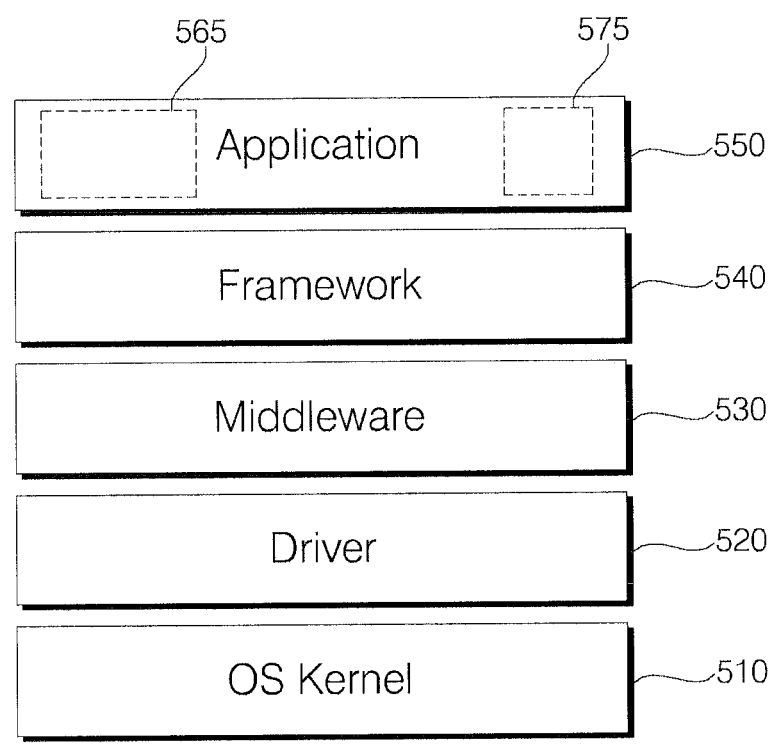
FIG. 12 shows another platform architecture.

FIG. 11 shows one type of a platform architecture that may be used the image display apparatuses herein, and FIG. 12 shows another type of platform architecture. A platform for either of the image display apparatuses may have OS-based software to implement the above-described various operations.

Referring to FIG. 11, a platform for either of the image display apparatuses is a separate type. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410. On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries. The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment is an integrated type. The integrated platform may include an OS kernel 510, a driver 520, middleware 530, a framework 540, and an application layer 550.

Compared to the separate-type platform illustrated in FIG. 11, the integrated-type platform is characterized by the absence of the library 435 and the application layer 550 being an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may be implemented functions that provide connectivity to specific subroutines, for execution of the functions within a program. Or APIs may be implemented programs.

For example, sources related to hardware drivers of the OS kernel 410, such as a display driver, a WiFi driver, a Bluetooth driver, a USB driver or an audio driver, may be opened.

Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened.

Such various open APIs allow developers to create applications executable in the image display apparatus 100 or applications required to control operations of the image display apparatus 100 based on the platforms illustrated in FIGS. 11 and 12.

The platforms illustrated in FIGS. 11 and 12 may be general-purpose ones that can be implemented in many other electronic devices as well as in image display apparatuses. The platforms may be stored or loaded in the memory 140, the controller 170, or any other processor (not shown). To execute applications, an additional application processor (not shown) may be further provided.

Figure 13:
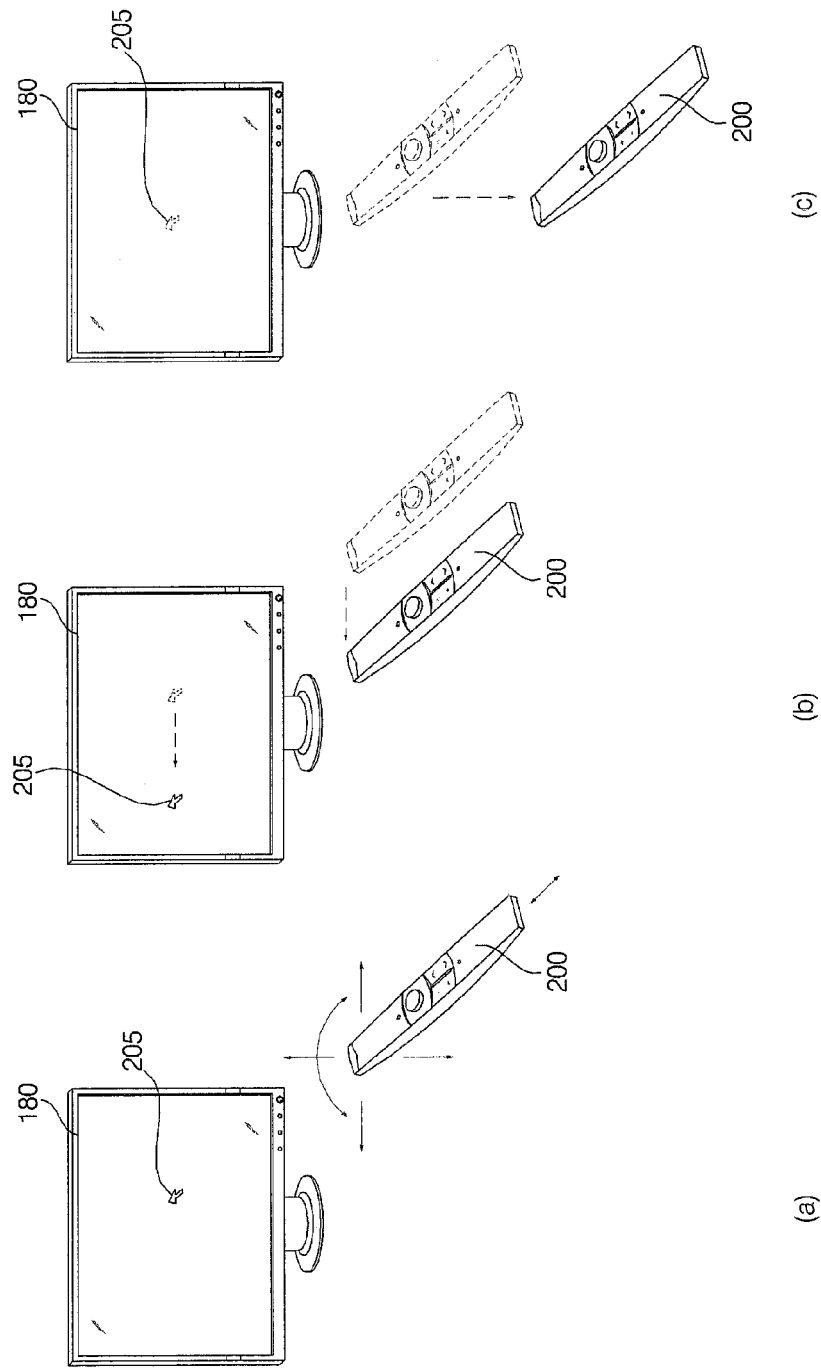
FIG. 13 shows one embodiment of a method for controlling an image display apparatus using a remote controller.

FIG. 13 shows one embodiment of a method for controlling an image display apparatus based on a remote controller. FIG. 13(a) illustrates a pointer 205 representing movement of the remote controller 200 displayed on the display 180.

The user may move or rotate the remote controller 200 up and down, side to side (FIG. 13(b)), and back and forth (FIG. 13(c)). Since the pointer 205 moves in accordance with the movement of the remote controller 200, the remote controller 200 may be referred to as a pointing device.

Referring to FIG. 13(b), if the user moves the remote controller 200 to the left, the pointer 205 moves to the left on the display 180. A sensor of the remote controller 200 detects the movement of the remote controller 200 and transmits motion information corresponding to the result of the detection to the image display apparatus, Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 13(c), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200. The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
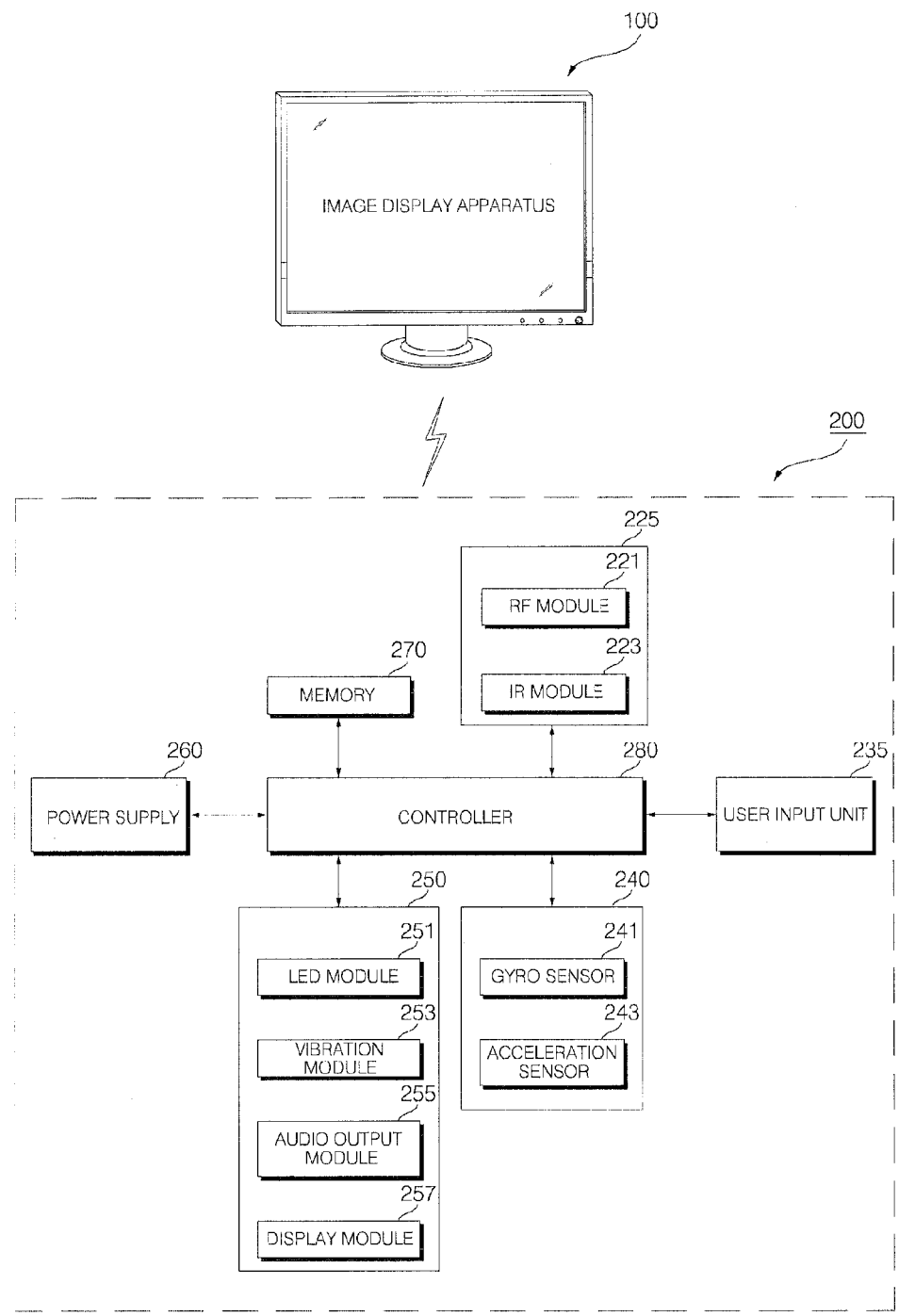
FIG. 14 shows one type of remote controller that may be used with an image display apparatus.

FIG. 14 shows one type of remote controller 200 which includes a wireless communication module 225, a user input unit 235, a sensor unit 240, an output unit 250, a power supply 260, a memory 270, and a controller 280.

The wireless communication module 225 transmits signals to and/or receives signals from either of the afore-described image display apparatuses, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 351 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

Figure 15:
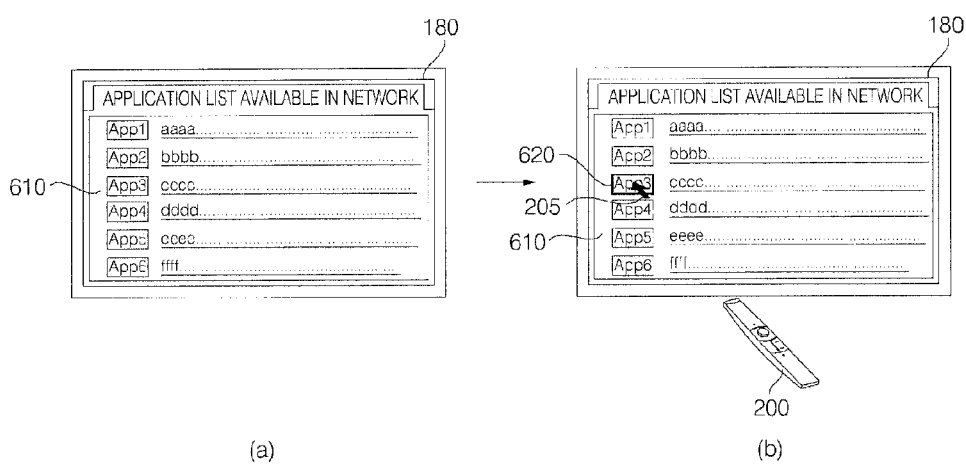
FIG. 15 shows a user interface (UI) for display on an image display apparatus.

FIGS. 15 to 18 show various types of user interfaces (UIs) that may be displayed in an image display apparatus. Referring to FIG. 15, an application list available from a network is displayed on the display 180. A user may access a CP or an NP directly, search for various applications, and download the applications from the CP or the NP.

Specifically, FIG. 15(a) illustrates an application list 610 available in a connected server, displayed on the display 180. The application list 610 may include an icon representing each application and a brief description of the application. Because each of the image display apparatuses is capable of full browsing, it may enlarge the icons or descriptions of applications received from the connected server on the display 180. Accordingly, the user can readily identify applications, which will be described later.

FIG. 15(b) illustrates selection of one application 620 from the application list 610 using the pointer 205 of the remote controller 200. Thus, the selected application 620 may be easily downloaded.

Figure 16:
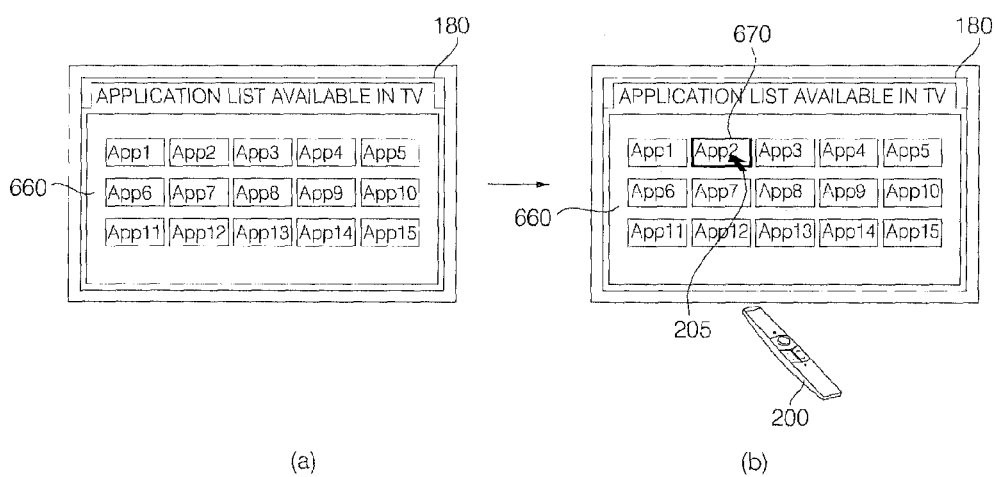
FIG. 16 shows another UI for display on an image display apparatus.

FIG. 16 shows an application list available in the image display apparatus, displayed on the display 180. Referring to FIG. 16(a), when the user selects an application list view menu by manipulating the remote controller 200, a list of applications 660 stored in the image display apparatus is displayed on the display 180. While only icons representing the applications are shown in FIG. 16, the application list 660 may further include brief descriptions of the applications, like the application list 610 illustrated in FIG. 15. Therefore, the user can readily identify the applications.

FIG. 16(b) illustrates selection of one application 670 from the application list 660 using the pointer 205 of the remote controller 200. Thus, the selected application 670 may be easily executed.

While it is shown in FIGS. 15 and 16 that the user selects a desired application by moving the pointer 205 using the remote controller 200, the application may be selected in many other ways. For example, the user may select a specific application using a cursor displayed on the display 180 by a combined input of a local key and an OK key in the remote controller 200.

In another example, if the remote controller 200 has a touch pad, the pointer 205 moves on the display 180 according to touch input of the touch pad. Thus the user may select a specific menu using the touch-based pointer 205.

Figure 17:
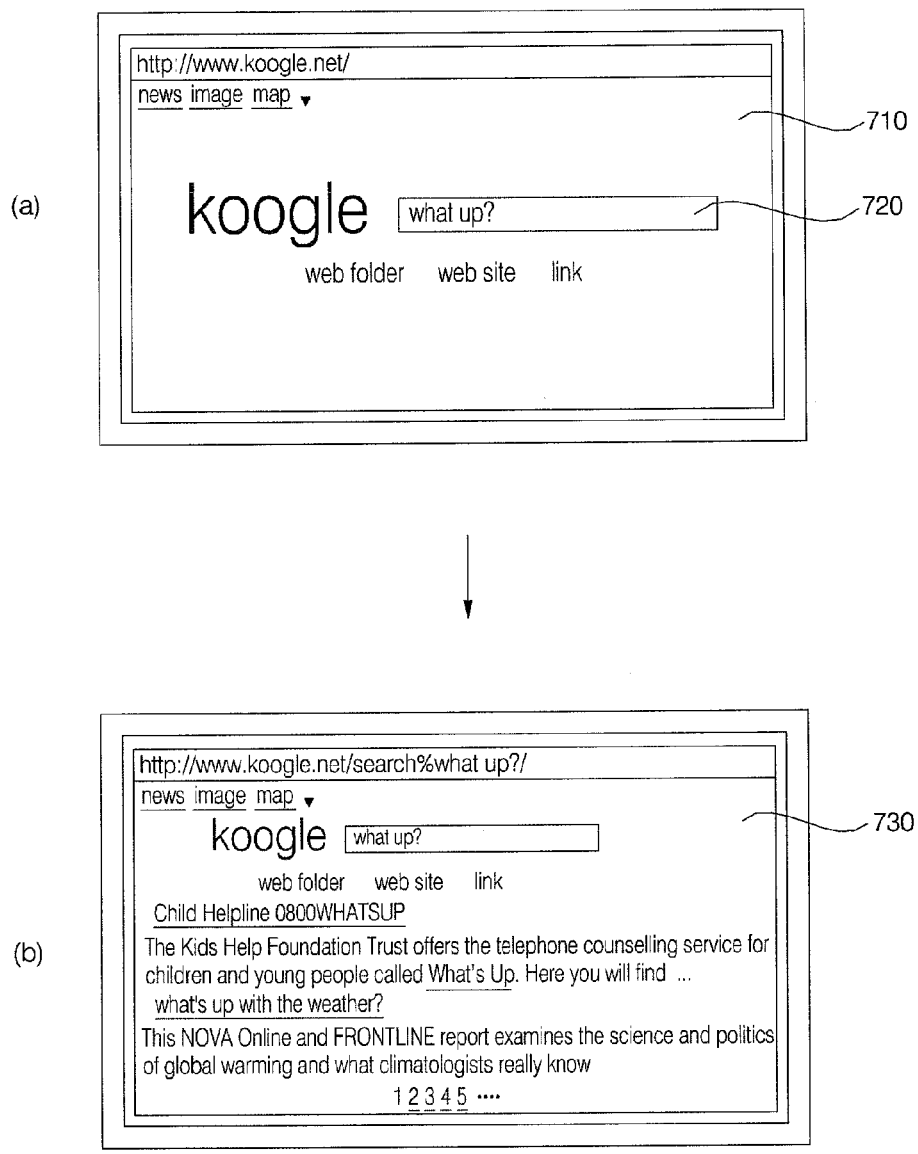
FIG. 17 shows another UI for display on an image display apparatus.

FIG. 17 shows one type of Web page displayed on the display 180. Specifically, FIG. 17(a) illustrates a Web page 710 with a search window 720, displayed on the display 180. The user may enter a character into the search window 720 by use of character keys (not shown) of a keypad displayed on a screen, character keys (not shown) provided as local keys, or character keys (not shown) of the remote controller 200.

FIG. 17(b) illustrates a search result page 730 having search results matching a keyword entered into the search window 720. Since the image display apparatuses are capable of fully browsing a Web page, the user can easily read the Web page.

Figure 18:
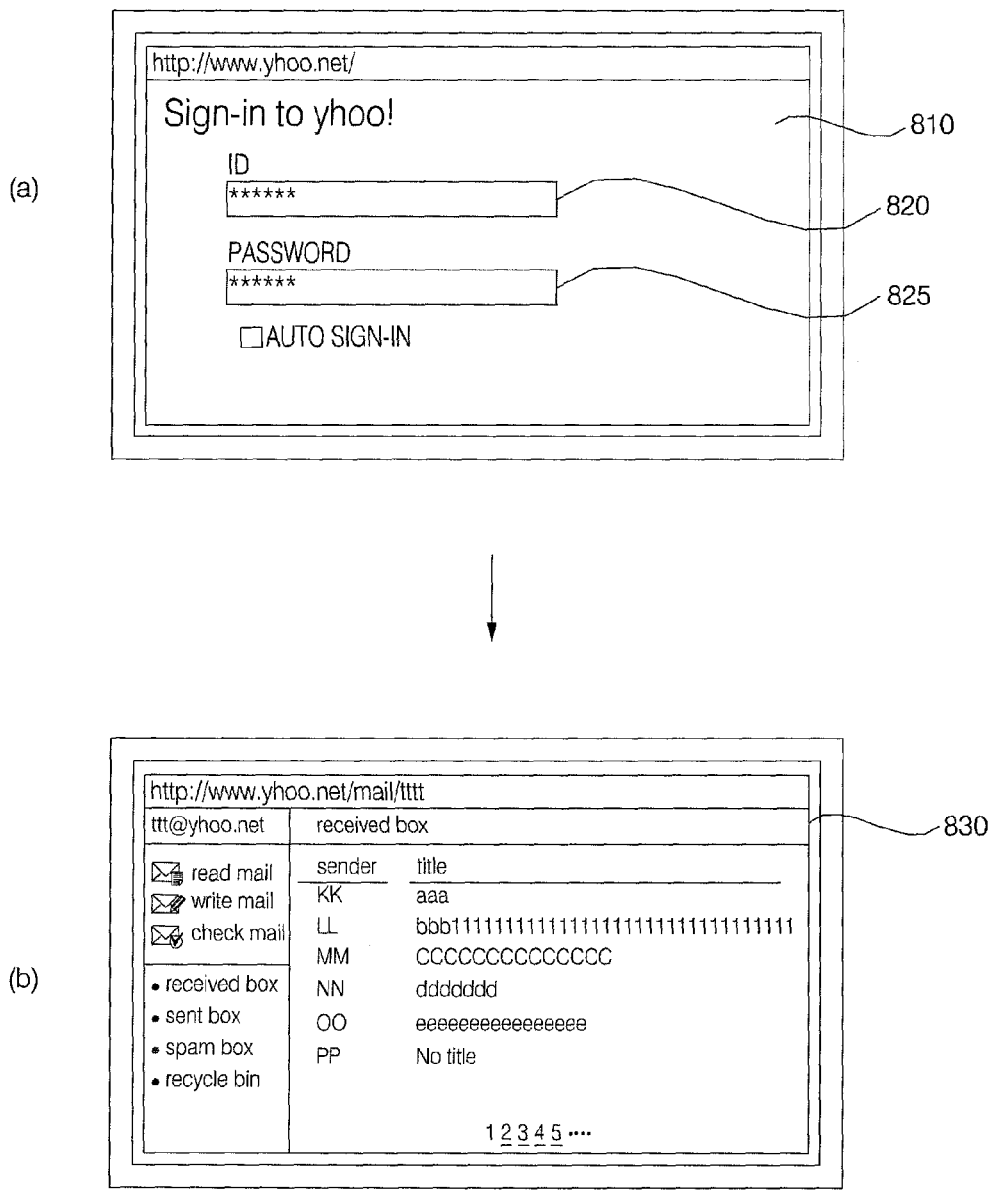
FIG. 18 shows another UI for display on an image display apparatus.

FIG. 18 shows another Web page displayed on the display 180. Specifically, FIG. 18(a) illustrates a mail service page 810 including an ID input window 820 and a password input window 825, displayed on the display 180. The user may enter a specific numeral and/or text into the ID input window 820 and the password input window 825 using a keypad (not shown) displayed on the mail service page 810, character keys (not shown) provided as local keys, or character keys (not shown) of the remote controller 200. Hence, the user can log in to a mail service.

FIG. 18(b) illustrates a mail page 830 displayed on the display 180, after log-in to the mail service. For example, the mail page 830 may contains items "read mail", "write mail", "sent box", "received box", "recycle bin", etc. In the "received box" item, mail may be ordered by sender or by title.

The image display apparatuses are capable of full browsing when displaying a mail service page. Therefore, the user can use the mail service conveniently.

Figure 19:
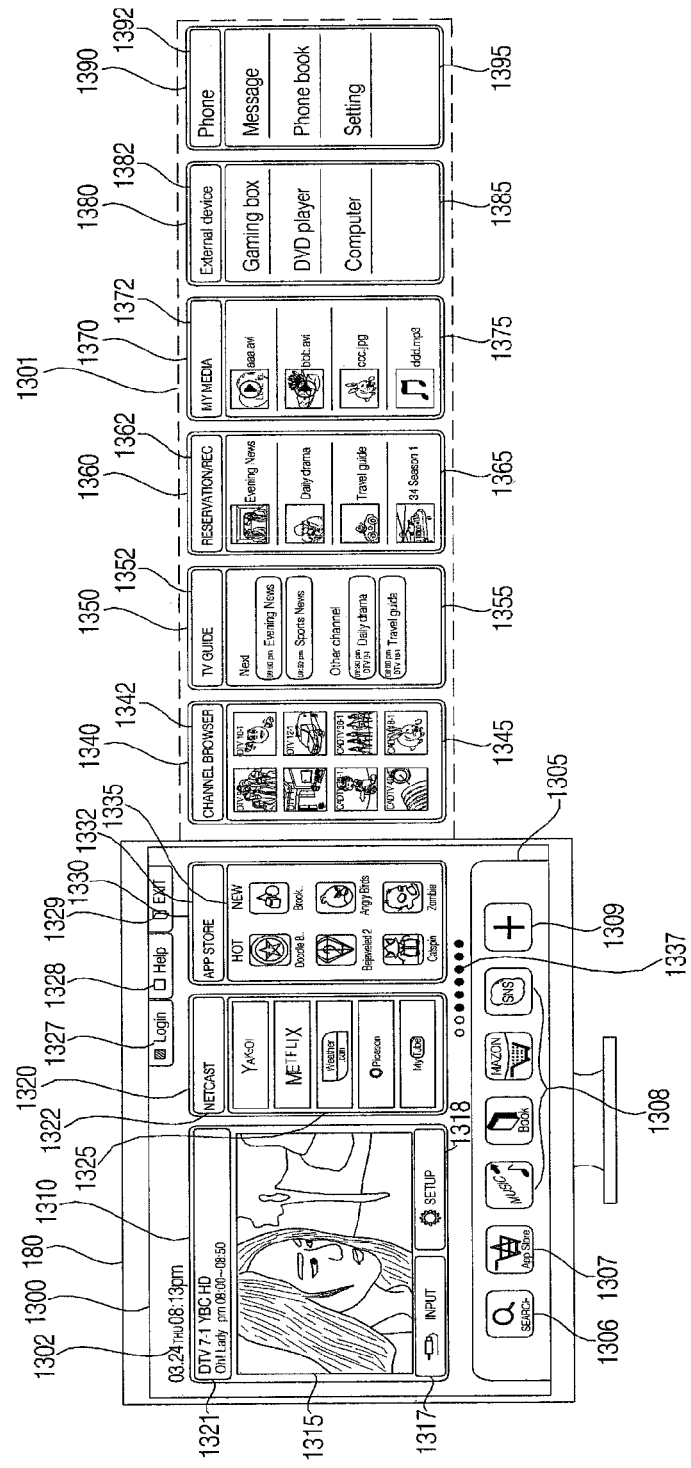
FIG. 19 shows is a view to be used for methods for operating an image display apparatus according to various embodiments herein.

FIG. 19 shows an example of a home screen which may be a default screen configuration for a smart TV. The home screen may be set as an initial screen that is displayed when the image display apparatus 100 is powered on or wakes up from standby mode, or as a default screen that is displayed when a local key (not shown) or a home key of the remote controller 200 is manipulated.

Referring to FIG. 19, a card object area may be defined in a home screen 1300. The card object area may include a plurality of card objects 1310, 1320 and 1330 classified according to content sources.

In the illustrated case of FIG. 19, the card object 1310 is named BROADCAST and displays a broadcast image. The card object 1320 is named NETCAST and provides a CP list. The card object 1330, which is named APP STORE, provides a list of applications.

Other card objects may be arranged in a hidden area 1301 and thus hidden from the display 180. These card objects may be shifted to show up on the display 180, substituting for card objects displayed on the display 180. The hidden card objects are a CHANNEL BROWSER card object 1340 for providing a thumbnail list of broadcast channels, a TV GUIDE card object 1350 for providing a program list, a RESERVATION/REC card object 1360 for providing a reserved or recorded program list, a MY MEDIA card object 1370 for providing a media list available in the image display apparatus 100 or in a device connected to the image display apparatus 100, an EXTERNAL DEVICE card object 1380 for providing a list of connected external devices and a PHONE card object 1390 for providing a call-related list.

The BROADCAST card object 1310 may contain a broadcast image 1315 received through the tuner 110 or the network interface 130, an object 1321 for providing information about the broadcast image 1315, an object 1317 representing an external device and a setup object 1318.

The broadcast image 1315 is displayed as a card object. Since the broadcast image 1315 may be fixed in size by a lock function, the user may continue viewing the broadcast image 1315 conveniently.

It is also possible to scale the broadcast image 1315 according to user manipulation. For instance, the broadcast image 1315 may be enlarged or contracted by dragging the broadcast image 1315 with the pointer 205 of the remote controller 200. As the broadcast image 1315 is scaled up or down, four or two card objects may be displayed on the display 180, instead of the current three card objects.

When the broadcast image 1315 is selected in the card object 1310, the broadcast image 1315 may be full-screened on the display 180.

The object 1321 representing information about the broadcast image 1315 may include a channel number (DTV7-1), a channel name (YBC HD), the title of a broadcast program (Oh! Lady), and airing time (8:00-8:50 PM) of the broadcast program. Therefore, the user can be readily aware of information about the displayed broadcast image 1315.

If the user selects the object 1321, related EPG information may be displayed on the display 180.

An object 1302 for notifying a date (03.24), a day (THU), and a current time (8:13 PM) may be positioned above the card object 1310 that displays a broadcast image. Thus the user can identify time information readily through the object 1302.

The object 1317 may represent an external device connected to the image display apparatus 100. For example, if the object 1317 is selected, a list of external devices connected to the image display apparatus 100 may be displayed.

The setup object 1318 may be used to set various settings of the image display apparatus 100, such as video settings, audio settings, screen settings, reservation settings, setting of the pointer 205 of the remote controller 200, and network settings.

The card object 1320 representing a CP list may contain a card object name 1322 (NETCAST) and a CP list 1325. While Yakoo, Metflix, weather.com, Pcason, and My tube are shown as CPs in the CP list 1325 in FIG. 19, it is obvious that many other settings are available.

Upon selection of the card object name 1322, the card object 1320 may be displayed fullscreen on the display 180. The same may apply to other card objects.

If a specific CP is selected from the CP list 1325, a screen with a list of content provided by the selected CP may be displayed on the display 180.

The card object 1330 representing an application list may include a card object name 1332 (APP STORE) and an application list 1335. Applications may be sorted into predetermined categories in the application list 1335. In the illustrated case of FIG. 19, applications are sorted by popularity (HOT) and by time (NEW).

Upon selection of an application from the application list 1335, a screen that provides information about the selected application may be displayed on the display 180.

A Log-in menu item 1327, a Help menu item 1328, and an Exit menu item 1329 may be displayed above the card objects 1320 and 1330.

The user may log in to the APP STORE or a network connected to the image display apparatus 100 using the Log-in menu item 1327. The Help menu item 1328 provides guidance on operation of the image display apparatus 100. The Exit menu item 1329 is used to exit the home screen. When the Exit menu item 1329 is selected, a received broadcast image may be fullscreened on the display 180.

An object 1337 may be displayed under the card objects 1320 and 1330 to indicate the total number of available card objects. Alternatively or additionally, the object 1337 may indicate the number of card objects being displayed on the display 180 as well.

The card object 1340 representing a thumbnail list of broadcast channels may include a card object name 1342 (CHANNEL BROWSER) and a thumbnail list of broadcast channels 1345. Sequentially received broadcast channels are represented as thumbnail images in FIG. 19. The thumbnail images may be still images or moving pictures. The thumbnail list 1345 may include information about the channels along with the thumbnail images of the channels, so that the user can readily identify broadcast programs of the channels. The thumbnail images may be thumbnail images of pre-stored user favorite channels or thumbnail images of channels following or previous to the channel of the broadcast image 1315 displayed in the card object 1310. Although eight thumbnail images are displayed in FIG. 9, many other configurations are possible. Thumbnail images may be updated in the thumbnail list 1345.

Upon selection of a thumbnail image from the thumbnail list 1345, a broadcast image corresponding to the channel of the selected thumbnail image may be displayed on the display 180.

The card object 1350 providing a program list may contain a card object name 1352 (TV GUIDE) and a program list 1355. The program list 1355 may list broadcast programs that air after the broadcast program of the broadcast image 1315 or broadcast programs of other channels.

If a program is selected from the program list 1355, a broadcast image of the selected program or broadcasting information about the selected program may be displayed on the display 180.

The card object 1360 representing a reserved or recorded program list may include a card object name 1362 (RESERVATION/REC) and a reserved or recorded program list 1365. The reserved or recorded program list 1365 may include user-reserved programs or programs recorded by reservation. While a thumbnail image is displayed for each program, this is merely an exemplary application and thus various examples can be considered.

Upon selection of a reserved program or a recorded program from the reserved or recorded program list 1365, broadcast information about the reserved or recorded broadcast program or broadcast images of the recorded broadcast program may be displayed on the display 180.

The card object 1370 representing a media list may include a card object name 1372 (MY OBJECT) and a media list 1375. The media list 1375 may list media available in the image display apparatus 100 or a device connected to the image display apparatus 100. While the media are shown as moving pictures, still images, and audio in FIG. 19, many other media such as text, e-books, etc. may be added to the media.

Upon selection of a file from the media list 1375, the selected file may be opened and a screen corresponding to the selected file may be displayed on the display 180.

The card object 1380 representing a list of connected external devices may contain a card object name 1382 (EXTERNAL DEVICE) and a list 1385 of external devices connected to the image display apparatus 100. The external device list 1385 includes a gaming box, a DVD player, and a computer in FIG. 19, by way of example.

Upon selection of the card object name 1382, the card object 1380 may be displayed fullscreen on the display 180.

Upon selection of a specific external device from the external device list 1385, a menu related to the selected external device may be executed. For example, content may be played back from the external device and a screen corresponding to the reproduced content may be displayed on the display 180.

The card object 1390 representing a call-related list may include a card object name 1392 (PHONE) and a call-related list 1395. The call-related list 1395 may be a listing related to calls conducted in a portable phone (not shown), a computer (not shown), or the image display apparatus 100 capable of placing calls. For instance, the call-related list 1395 may include a message item, a phone book item, or a setting item. Upon receipt of an incoming call at the portable phone, the computer or the image display apparatus 100, the call-related card object 1390 may automatically show up in the card object area of the display 180. If the card object 1390 has already been displayed on the display 180, it may be focused on (highlighted).

Therefore, the user can readily identify incoming calls of a nearby portable phone (not shown), a computer (not shown), or the image display apparatus 100. This is interactive function among the portable phone, the computer, and the image display apparatus, called a 3-screen function.

Upon selection of the card object name 1392, the card object 1390 may be fullscreened on the display 180.

Upon selection of a specific item from the call-related list 1395, a screen corresponding to the selected item may be displayed on the display 180.

In FIG. 19, the card objects 1310, 1320 and 1330 are displayed in the card object area 1300, and the card objects 1340 to 1390 are placed in the hidden area 1301, by way of example.

The card objects 1320 and 1330 displayed on the display 180 may be exchanged with the hidden card objects 1340 to 1390 according to a card object shift input. Specifically, at least one of the card objects 1320 and 1330 being displayed on the display 180 may move to the hidden area 1301 and in turn, at least one of the hidden objects 1340 to 1390 may show up on the display 180.

An application menu 1305 includes a plurality of application menu items, particularly predetermined menu items 1306 to 1309 selected from among all available application menu items on the display 180. Thus the application menu 1305 may be referred to as an application compact-view menu.

The application menu items 1306 to 1309 may be divided into mandatory application menu items 1306, 1307 and 1309 (Search, App Store, and +) and optional application menu items 1308 (Music, Book, MAZON, and SNS) set by the user.

The mandatory application menu items 1306, 1307 and 1309 may be fixed such that the user is not allowed to edit the same. The Search application menu item 1306 provides a search function based on an input search keyword. The App Store application menu item 1307 enables the user to access an AppStore directly. The + (View More) application menu item 1309 may provide a fullscreen function.

In an exemplary embodiment, an Internet application menu item and a mail application menu item may be added as mandatory application menu items in the application menu 1305.

The user-set application menu items 1308 may be edited to represent applications that the user often uses.

Figure 20:
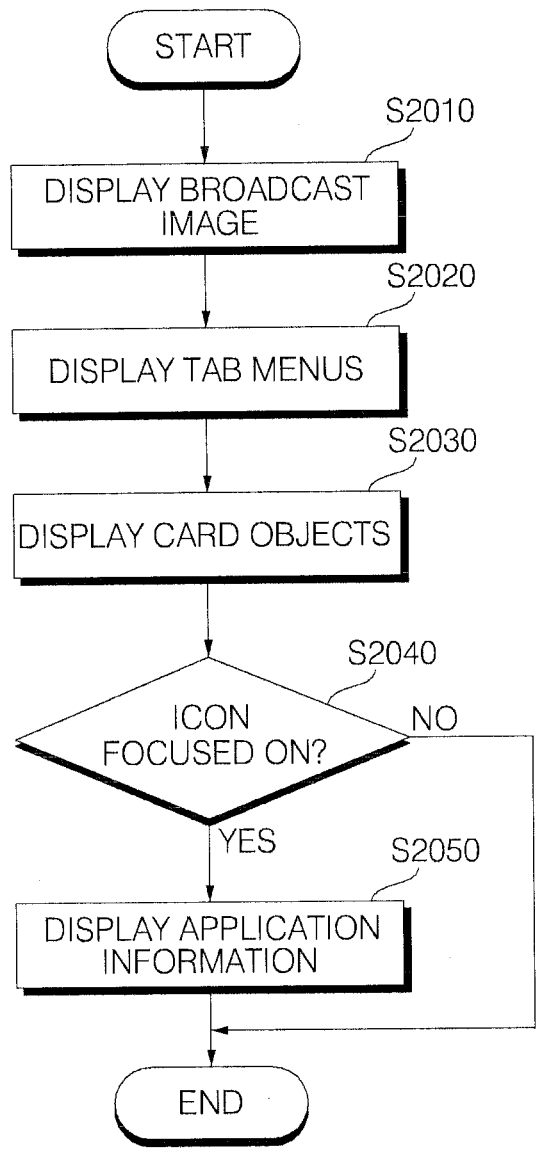
FIG. 20 shows one embodiment of a method for operating an image display apparatus.

FIG. 20 shows one embodiment of a method for operating an image display apparatus, and FIGS. 21 to 31 are views that may be generated for this method. The method includes displaying a broadcast image, displaying icons representing a plurality of applications in a plurality of card objects, and when one of the icons is focused on, displaying information about an application corresponding to the focused icon.

The method for operating an image display apparatus depicted in FIG. 20 is an exemplary case, in which a plurality of card objects are classified and arranged under tab menus according to classification.

Referring to FIG. 20, a broadcast image is displayed in a first area (S2010) and tab menus corresponding to categories into which a plurality of applications are classified are displayed in a second area (S2020). Upon selection of a tab menu, applications that fall into a category corresponding to the selected tab menu are re-classified and the icons of the applications are displayed in a plurality of card objects according to the re-classified applications (S2030). When one of the icons is focused on (S2040), information about an application corresponding to the focused icon is displayed in a third area (S2050).

Instead of the tab menus, any other type of menus may be displayed in step S2020. Alternatively, step S2020 may be omitted. That is, card objects including a plurality of icons may be displayed in a part of the display 180.

Figure 21:
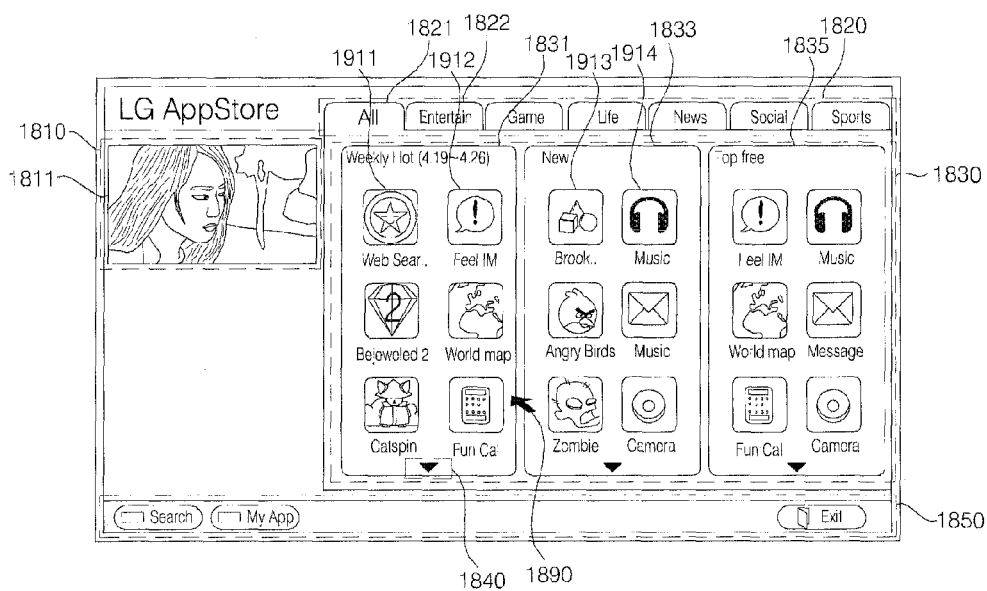
FIGS. 21 to 31 shows views for describing various steps in one embodiment of a method for operating an image display apparatus.

FIGS. 21 to 30 are exemplary screens of an application market (AppStore). Referring to FIG. 21, a broadcast image 1811 is displayed in a first area 1810 of the display 180. Meanwhile, tab menus corresponding to categories into which a plurality of applications are classified may be displayed in another area, herein, a second area 1820.

As new applications are continuously emerging on the market, users cannot easily identify applications displayed on a screen due to insufficient knowledge of the new applications. However, if applications are classified into categories such as Games, News, Sports, etc. as illustrated in FIG. 21, a user may identify the applications more easily.

In addition, the user can access the application market, while viewing the broadcast image 1811. Hence, the user may search for an application to install, without missing a desired content.

Upon selection of one of the tab menus, a plurality of card objects 1831, 1833 and 1835 are displayed at least in a partial area 1830 of the display 180. Icons representing applications 1911 included in the selected tab menu are classified into the card objects 1831, 1833 and 1835.

That is, applications that fall into a category corresponding to the selected tab menu are re-classified according to a predetermined criterion on a card object basis, so that the user can identify the applications more readily.

In the illustrated case of FIG. 21, a tab menu corresponding to a category 'All' 1821 containing all applications is selected. The selected category 1821 may be displayed differently from the other categories 1822 in color, size, etc.

One of the tab menus may be selected by the user or by a setting.

For instance, with the category 'All' 1821 set as a default category, when the user accesses the application market, card objects under the category 'All' 1821 may be automatically displayed on the display 180, as illustrated in FIG. 21.

The card objects may include the card object 1831 representing popular applications during a preset time period, a card object representing top-ranking paid applications, the card object 1835 representing top-ranking free applications, and the card object 1833 representing new applications.

The preset time period may be, for example, one day, one week, one month, one quarter, a half year, or one year. A different statistical time period may be set for each card object. For example, the popularity ranking card object 1831 representing the download or installation rankings of applications may be based on weekly statistics and thus displayed on a weekly basis. For the top-ranking free card object 1835 and the top-ranking paid card object, a statistical time period may be set to be infinite and thus these objects may display applications ranked in terms of total number of downloads or total number of installs.

The new application card object 1833 indicates new applications introduced during a preset time period. The new application card object 1833 may be based on a different statistical time period from other card objects.

At least one of the plurality of card objects may further include a menu object 1840 that allows the user to view more applications. The menu object 1840 may be represented as one of various graphic objects. For instance, the menu object 1840 may take the form of an arrow. Upon receipt of an input corresponding to the menu object 1840, icons representing applications positioned in the arrowed direction may be displayed. The menu object 1840 may also take the form of a screen switch icon that, upon selection, switches from a current screen with displayed icons to another screen with only hidden icons, or a view more icon that, upon selection, makes at least one hidden icon to show up in a card object corresponding to the view more icon and thus displays the hidden icon along with already-displayed icons.

The menu object 1840 may be selected using a directional key input of the image display apparatus 100 or a pointer 1890 corresponding to movement of the remote controller 200. Then icons representing applications included in a card object having the menu object 1840 are displayed. Other menu items such as Search, My App, and Exit may be displayed in a partial area 1850 of the display 180.

Figure 22:
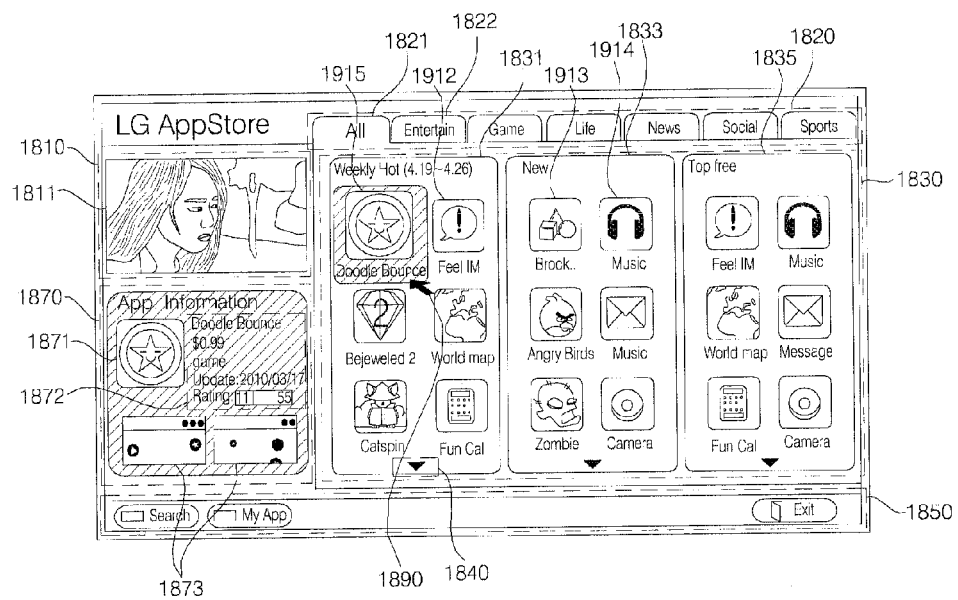

Referring to FIG. 22, the user may move the pointer 1890 using the remote controller 200. When the pointer 1890 moves to the icon of an application, the icon is focused on.

While an icon is focused on when the pointer 1890 moves to and is placed over the icon in FIG. 22, the icon may be focused in other manners. For example, a cursor is designed to move from one icon to another. Upon receipt of a right directional key input from the remote controller 200, the cursor moves to the right icon. Upon receipt of a left directional key input from the remote controller 200, the cursor moves to the left icon. In this case, the cursor may take the form of a figure or symbol that flickers around an icon.

Thereafter, information 1871, 1872 and 1873 about an application corresponding to the focused icon is displayed in a third area 1870 (S2050).

The application information may include the focused icon 1871, brief information 1872 expressed as text or graphics, and screen shots 1873 that are exemplary screens generated when the application is executed. The brief information 1872 may specify the name, price, category, most recent update date, user rating, and user reviews of the application.

Because applications are classified into categories corresponding to tab menus, re-classified in each category, and arranged in a plurality of card objects according to the re-classifications of the applications, the user can readily identify displayed applications. Further, when an icon is focused on, information about an application corresponding to the icon is displayed. Thus the user can easily acquire details of the application.

When an icon 1915 is focused on, the icon 1915 is enlarged, highlighted, or outlined in the same color as the background of the third area 1870. The focused icon 1915 is marked with slash lines in FIG. 22. For convenience, it is assumed herein that slash lines drawn in the same direction represent the same color. Thus the focused icon 1915 is shown as surrounded by the same color as the background of third area 1870 in FIG. 22.

As the focused icon 1915 is enlarged or highlighted relative to other icons 1912, 1913 and 1914, the user is aware that the icon 1915 is focused on.

Further, because the focused icon 1915 is surrounded by the same color as the background of the third area 1870 as illustrated in FIG. 22, the focused icon 1915 is more conspicuous to the user.

However, the background of the third area 1870 may be colored differently from the backgrounds of the card objects 1831, 1833 and 1835. In consideration of the assumption that a color is represented as slash lines drawn in a specific direction in FIG. 22, it is noted that the backgrounds of the card objects 1831, 1833 and 1835 are not colored at all, or have a default color.

Unlike FIG. 22, the card objects 1831, 1833 and 1835 may take the form of card-type graphic objects having a predetermined background color in order to distinguish them from the other card objects and the other areas of the display 180 and increase the visibility of icons displayed in the card objects 1831, 1833 and 1835. In this case, the background of the third area 1870 in which application information is displayed is colored differently from the card objects 1831, 1833 and 1835 to help the user notice the focused icon and the associated information.

In other words, a new image and application information in the third area 1870 may be more easily noticed by coloring the background of the third area 1870 differently from the other areas.

Meanwhile, at least one of the size or position of the first area 1810 in which the broadcast image 1811 is displayed may be changed. That is, the first area 1810 may be moved from the position illustrated in FIG. 21 and thus the broadcast image 1811 may be displayed in the moved first area 1810. Also, the first area 1810 may be enlarged so that the user can view the broadcast image 1811 more easily, or contracted so that the user can concentrate on applications.

In the absence of any focused icon, a predetermined image such as an advertisement may be displayed in the third area 1870. Compared to FIG. 21 in which the third area 1870 is empty, the third area 1870 may be utilized to display an advertisement, other information, or a specific image, in the case where application information need not be displayed.

In another embodiment of the method for operating an image display apparatus, a broadcast image is displayed in a first area, tab menus corresponding to categories into which a plurality of applications are classified are displayed in a second area. Upon selection of one of the tab menus, icons representing applications that fall into a category corresponding to the selected tab menu are displayed in a plurality of card objects. Upon receipt of an object shift command for one of the card objects, the card object for which the object shift command has been issued is exchanged with a card object positioned in a direction indicated by the object shift command.

FIGS. 23 to 27 illustrate exemplary operations for moving a card object. The method for operating an image display apparatus according to this embodiment may further include moving at least one of a plurality of card objects.

Figure 23:
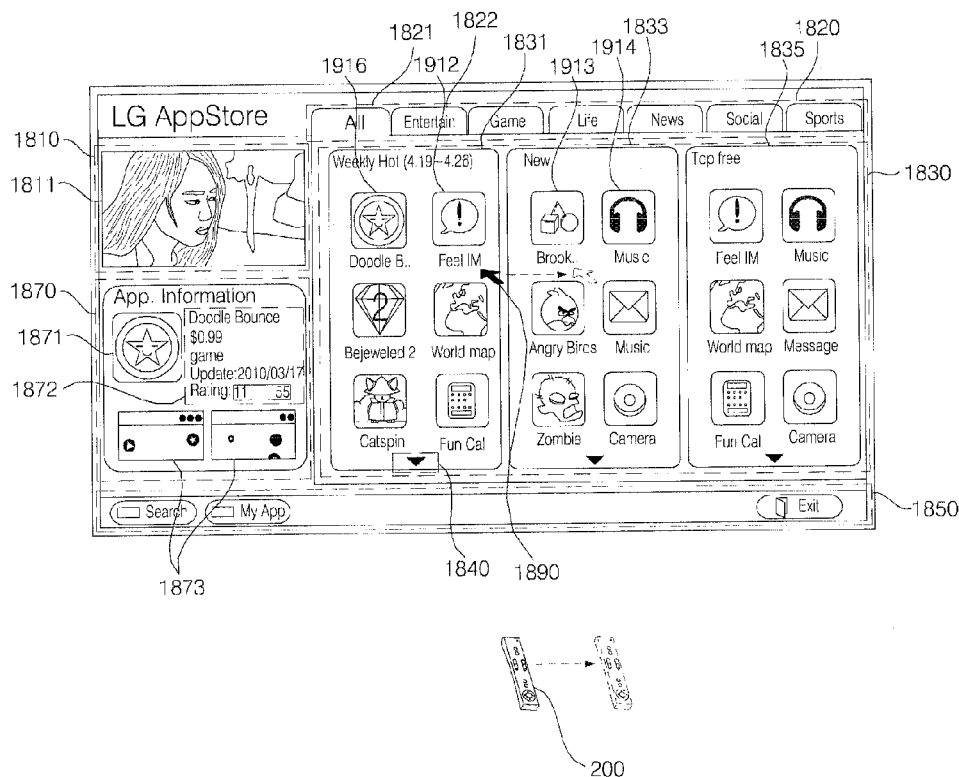

FIG. 23 shows an exemplary operation for inputting an object shift command using the pointer 1890. Referring to FIG. 23, an object shift command may be input by selecting one of the plurality of card objects 1831, 1833 and 1935, for example, the card object 1833 using the pointer 1890 corresponding to movement of the remote controller 200 and by moving the pointer 1890 to a target position in a drag-and-drop fashion.

In an exemplary embodiment, upon receipt of an object shift command for one of the card objects, the card object may be exchanged with a card object positioned at the direction indicated by the object shift command on the display 180.

Figure 24:
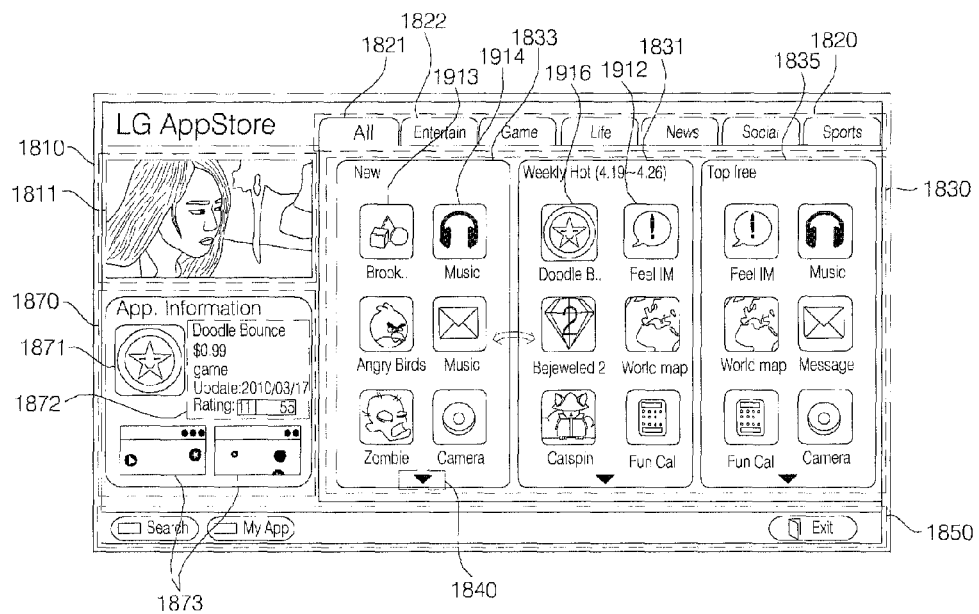

Referring to FIG. 24, if the object shift command indicates leftward movement of the card object 1833, the card object 1833 may be exchanged with the next card object 1831 positioned to the left of the card object 1833 on the display 180.

In another exemplary embodiment, upon receipt of an object shift command for one of the card objects, at least two card objects may be moved according to a direction indicated by the object shift command.

Figure 25:
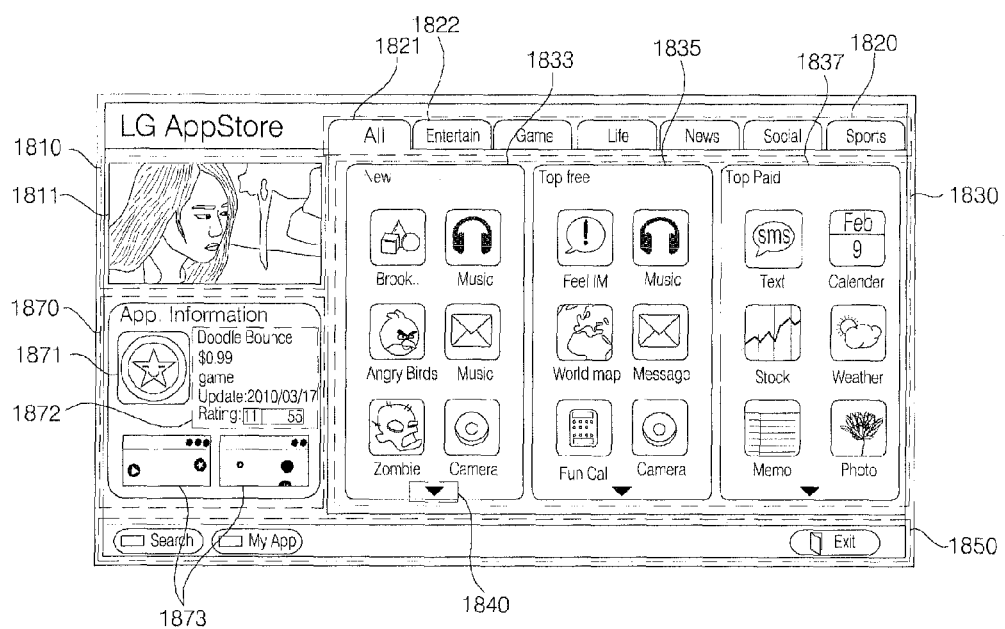

Referring to FIG. 25, if the object shift command instructs leftward movement of the card object 1833, both the card object 1833 and the card object 1835 on the right side of the card object 1833 may be shifted to the left.

In this case, a card object 1837 hidden on the right side of the display 180 appears and the leftmost card object 1831 is hidden from the display 180.

Figure 26:
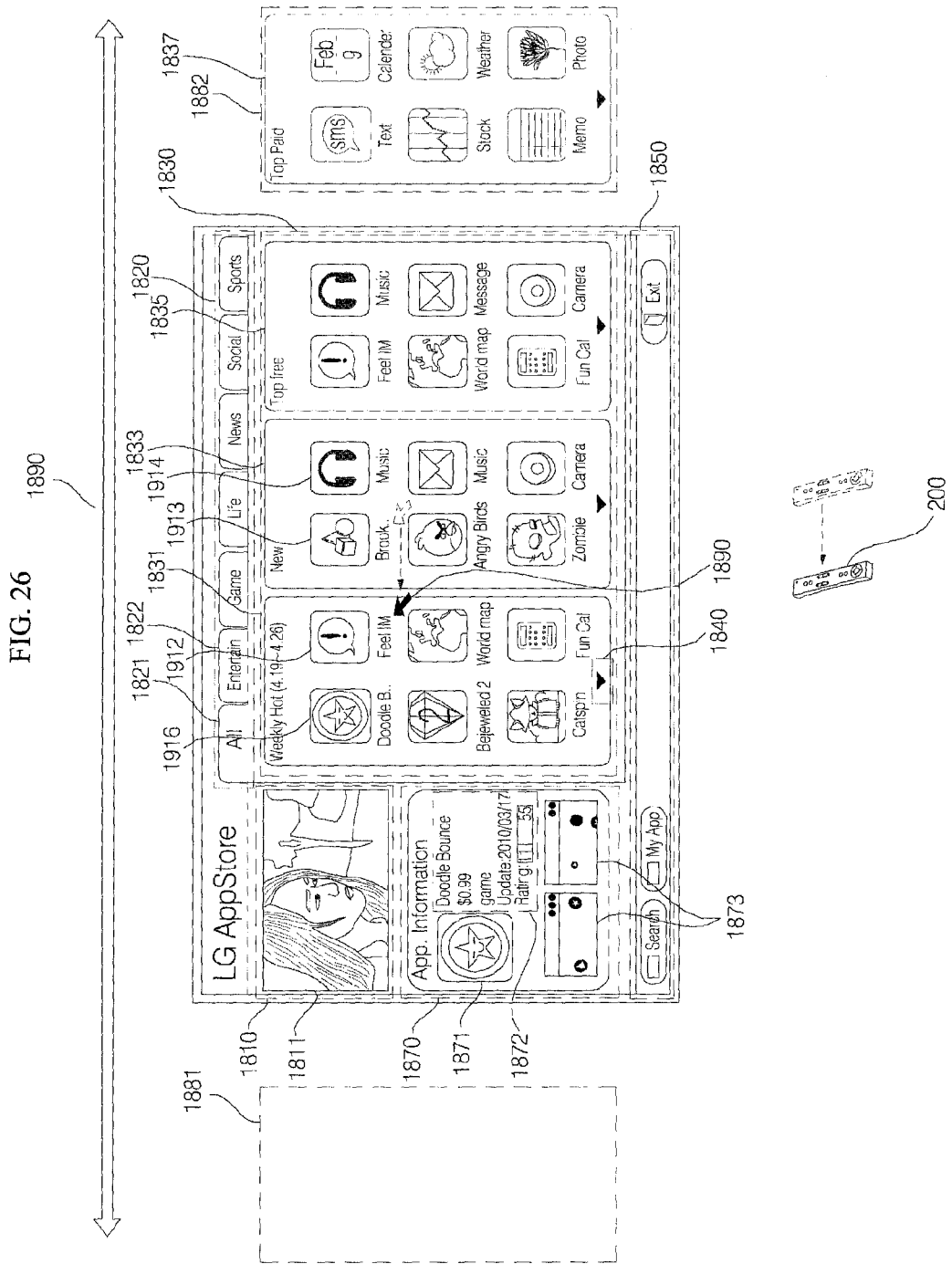
Figure 27:
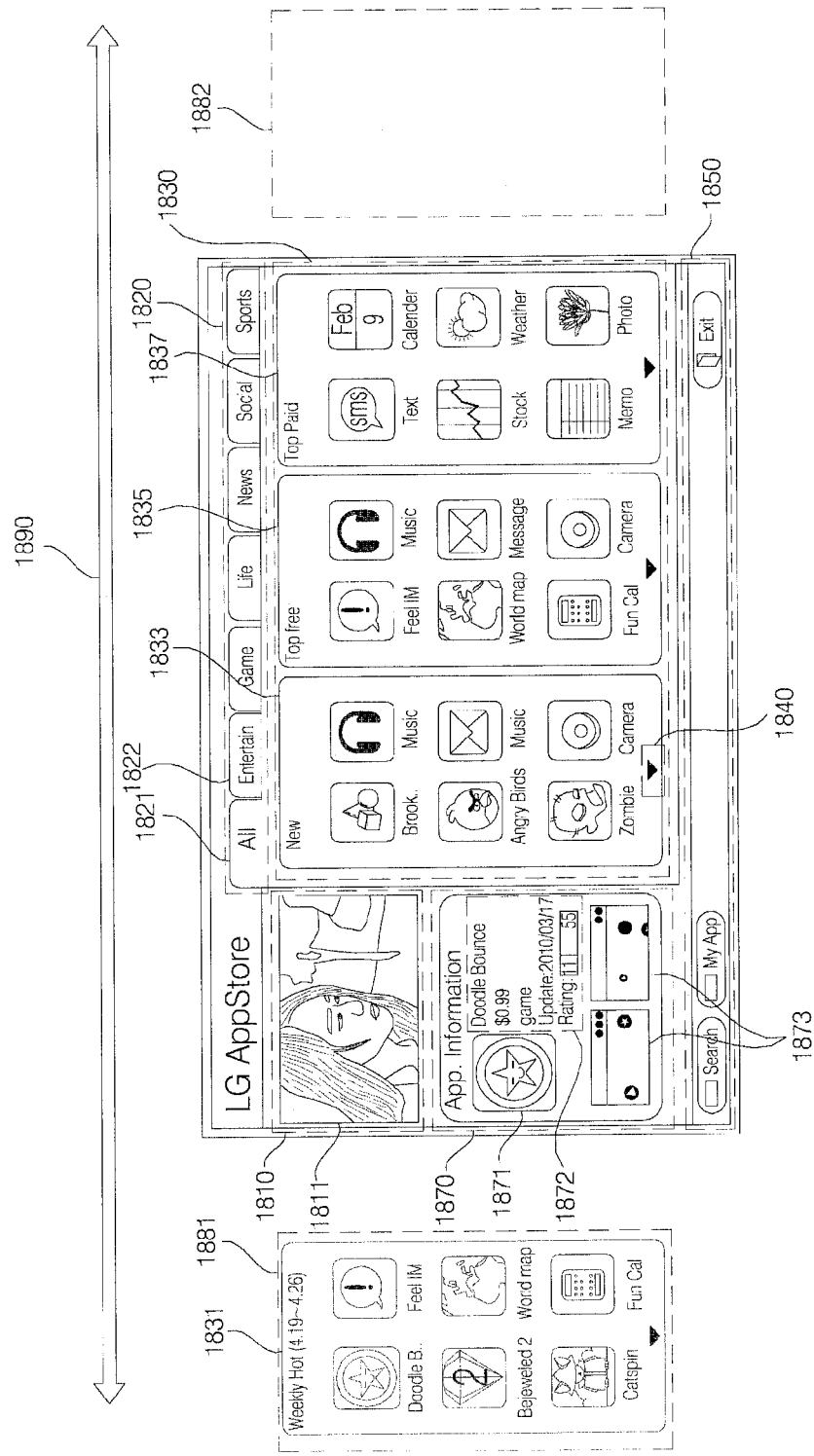
Figure 28:
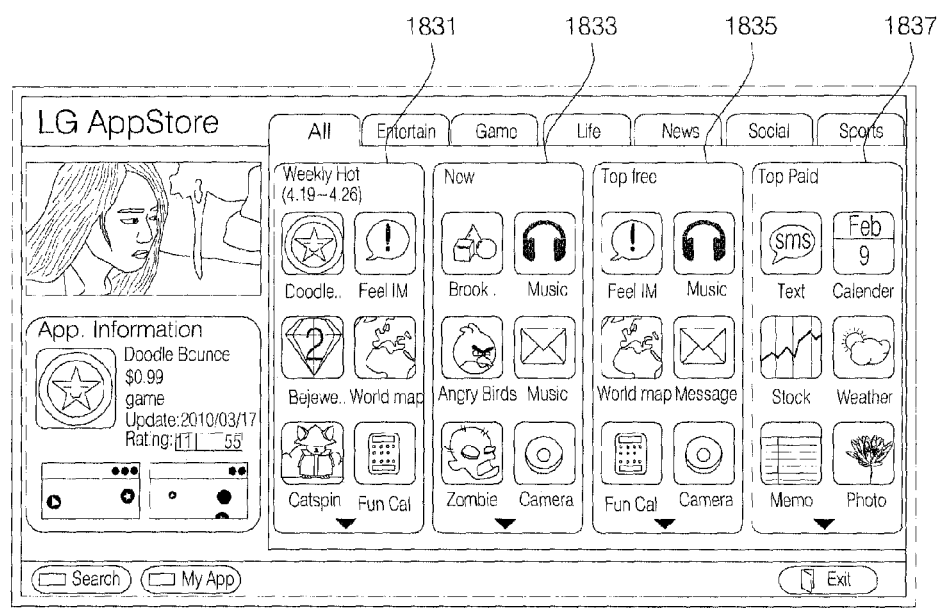

Referring to FIGS. 26 and 27, first and second hidden areas 1881 and 1882 linked to displayed areas are illustrated. More specifically, the hidden areas 1881 and 1882 may contain card objects that are not being displayed on the display 180. The image display apparatus 100 may display a hidden card object on the display 180 according to an object shift command received through the remote controller 200.

The shift command may be generated in various ways. For example, the shift command may be generated as a result of a user rapidly flicking the remote controller while a cursor is displayed on the screen. Alternatively, the shift command may be generated in response to a user pressing a button (similar to a page-up or page down) button on the remote controller. The shift signal may also be generated as a result of a user rapidly flicking the remote controller while holding down a button to display a cursor on the screen.

For example, upon receipt of a left shift command for at least one card object, the image display apparatus 100 displays the card object 1837 included in the second hidden area 1882 on the display 180. Accordingly, to the user, it appears that the card object 1837 shows up from the right of the displayed card object 1835.

The leftmost card object 1831 may move to the first hidden area 1882. That is, the leftmost card object 1831 is placed in a hidden state.

The user may input a left or right shift command for at least one card object to the image display apparatus 100. The image display apparatus 100 may display a card object included in the first or second hidden area 1881 or 1882 on the display 180 according to the received shift command. Hence, it appears to the user that card objects included in the first hidden area 1881, the display 180, and the second hidden area 1882 are moving to the left or right.

While once an application 1916 is focused on, information about the latest focused application 1916 continues to be displayed in the third area 1870 in FIGS. 23 to 27, the image display apparatus 100 may return to the screen of FIG. 21 or display a predetermined image such as an advertisement in the third area 1870, upon completion of the focusing.

In the illustrated cases of FIGS. 21 and 22, three card objects are displayed on the AppStore screen, by way of example. The number of card objects displayed on a screen may be changed. For instance, the card objects 1831, 1833, 1835 and 1837 are displayed on a screen in FIG. 28. In addition, a plurality of card objects may be arranged in a different order.

Figure 29:
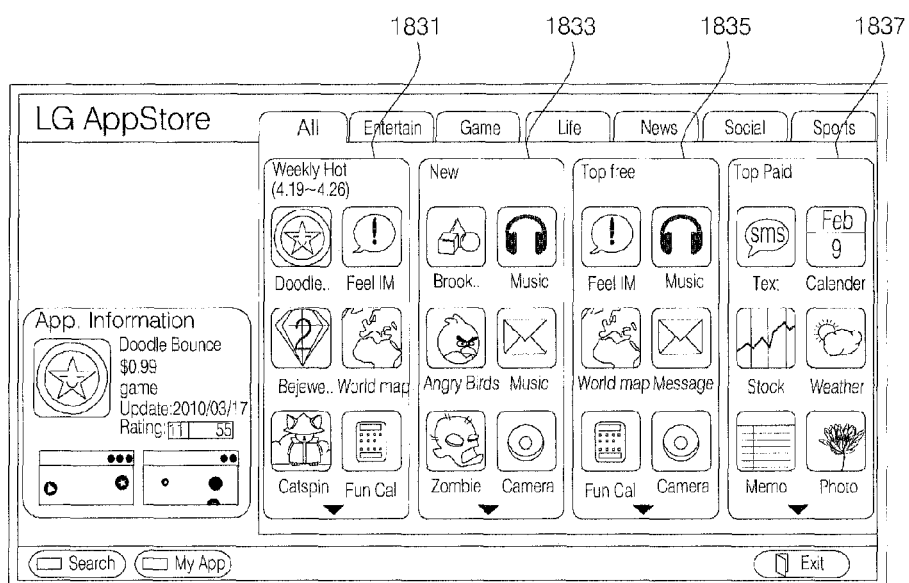

While the above description has been given by way of an example in which a broadcast image is displayed on a part of the display 180, the AppStore screen may be configured to be free of a broadcast image as illustrated in FIG. 29.

The method for operating an image display apparatus may further include displaying, upon selection of an icon, an application purchase menu window, or displaying, upon selection of an icon, an application purchase menu window and displaying an application installation menu window.

Figure 30:
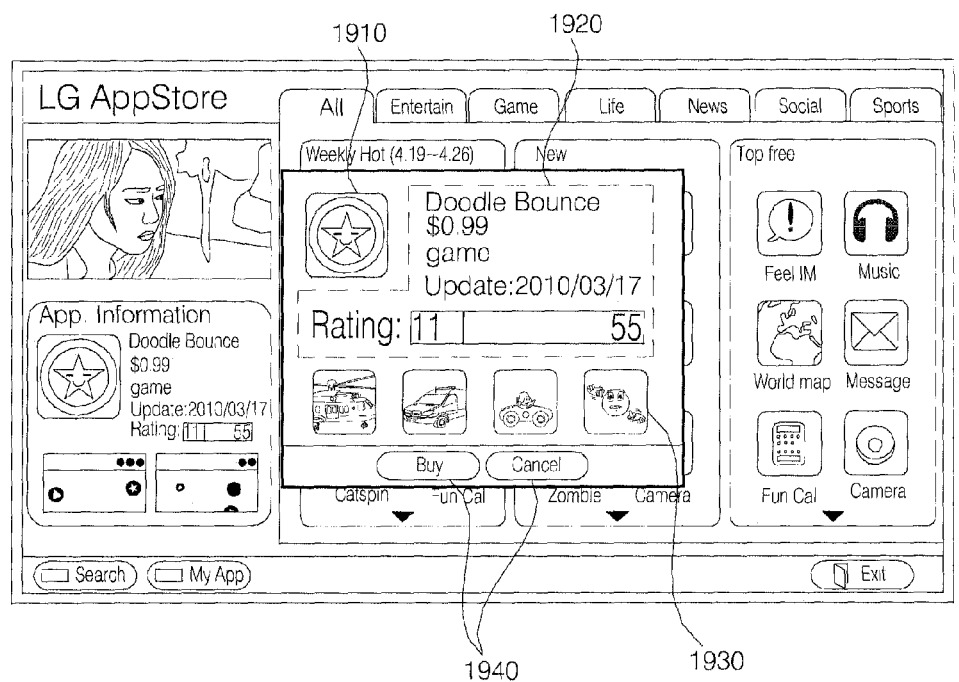

Referring to FIG. 30, the application purchase menu window may include at least one of a selected icon 1910, details 1920 of an application corresponding to the icon 1910, a screen shot 1930 that is an example of what might be created by executing the application, Buy and Cancel menu items 1940, or an application review item.

The visibility of the application purchase menu window may be improved by reducing the brightness of the other areas.

In an exemplary embodiment, upon selection of an icon, an application installation menu window may be displayed, for installation of an application corresponding to the selected icon. The application installation menu window may indicate the progress of download and installation of an application using a progress bar.

The visibility of the application installation menu window may be improved by reducing the brightness of the other areas.

The application purchase menu window and the application installation menu window may be displayed separately or incorporated into a single menu window. In the latter case, when the user selects an application, menus necessary to purchase and install an application may be displayed in one window. Accordingly, the method for operating an image display apparatus may further include, when an icon is selected, displaying a menu window including menus for purchasing and installing an application corresponding to the selected icon.

In an exemplary embodiment, when the application is installed, the current screen is switched to a screen that displays the installed application fullscreen. An icon representing an application being installed, an icon representing an application installed within a predetermined time period, or an icon representing the most recently installed application may be distinguished from icons representing the other applications by changing the display state of the icon.

Figure 31:
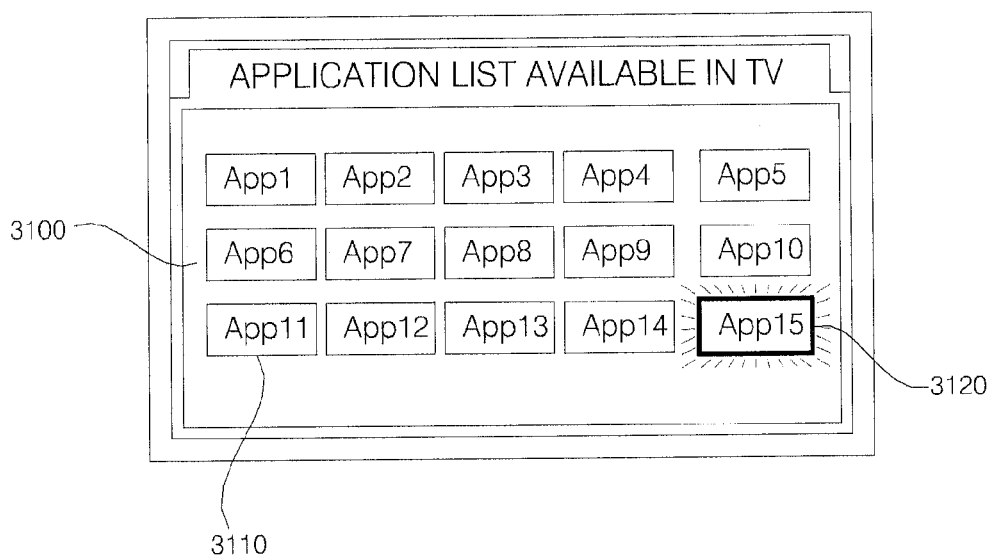

Referring to FIG. 31, upon receipt of an application installation command, the image display apparatus 100 may display an application list screen 3100 listing installed applications, instead of displaying menu windows or a notification of application installation progress on the AppStore screen. An application 3120 may flicker during installation, compared to already-installed applications 3110 on the application list screen 3100.

Figure 32:
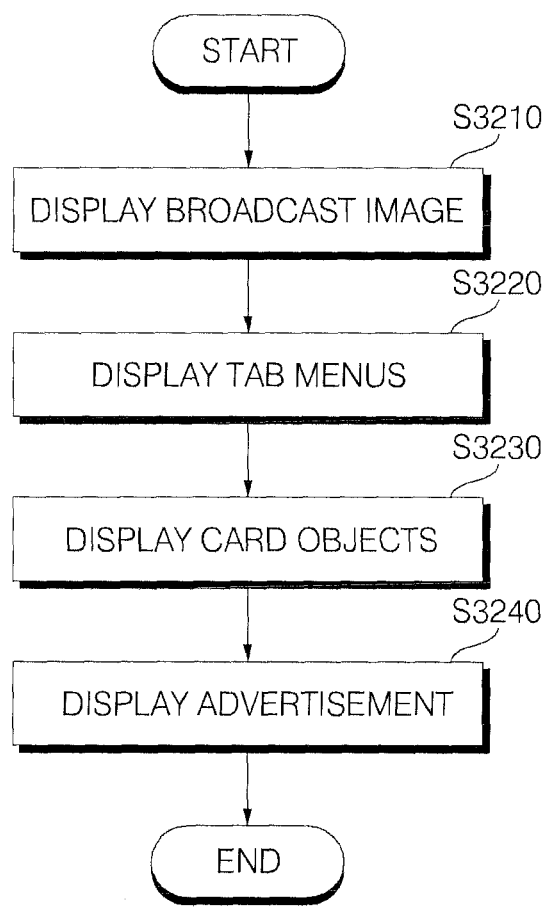
FIG. 32 shows steps included in another embodiment of a method for operating an image display apparatus.

FIG. 32 shows another embodiment of a method for operating an image display apparatus. Referring to FIG. 32, a broadcast image is displayed in a first area (S3210), and tab menus corresponding to categories into which a plurality of applications are classified are displayed in a second area (S3220). Upon selection of a tab menu, icons representing applications that fall into a category corresponding to the selected tab menu are classified into a plurality of card objects (S3230), and a specific image such as an advertisement is displayed in a third area (S3240). Further, if one of the icons is focused on, information about an application corresponding to the icon may be displayed in the third area.

Figure 33:
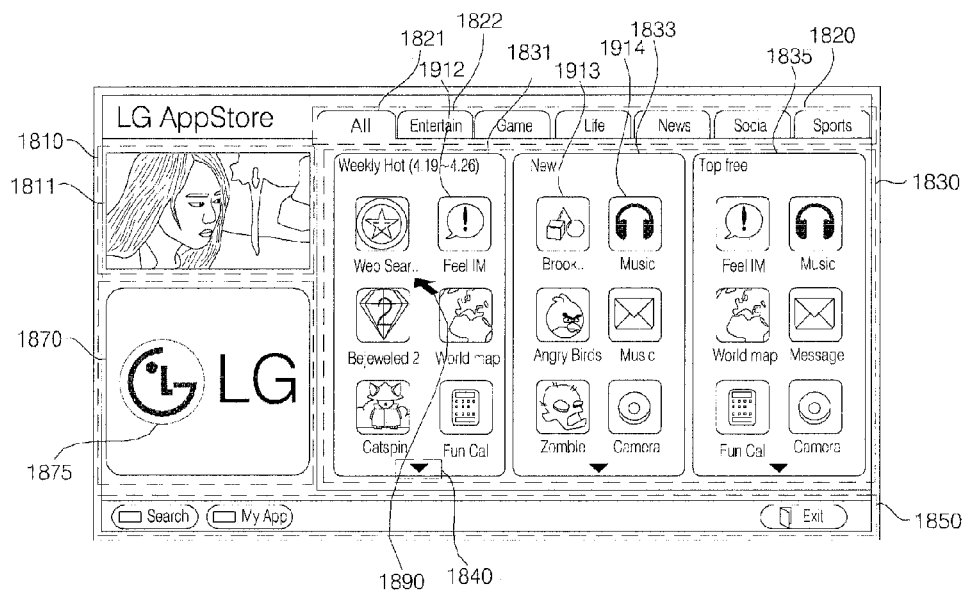
FIGS. 33 and 34 are additional views describing the method in FIG. 32.

Referring to FIG. 33, a specific image, for example, an advertisement 1875 is displayed in a part of the display 180, that is, in the third area 1870. The advertisement image 1875 may be received over a network or through a connected external device. If no signal of an advertisement is received, any image may be displayed. For example, the image may be a stored advertisement of the manufacturer of the image display apparatus 100.

Thus, both a screen related to applications and a live broadcast image may be displayed on the display 180. Unless the user selects or focuses on a specific application, a predetermined image such as an advertisement may be displayed in a part of the display 180.

When the user selects or focuses on an application, a screen related to the application may be displayed. When the user focuses on one of the icons, the image 1875 displayed in the third area 1870 may be replaced with information about an application corresponding to the focused icon.

Figure 34:
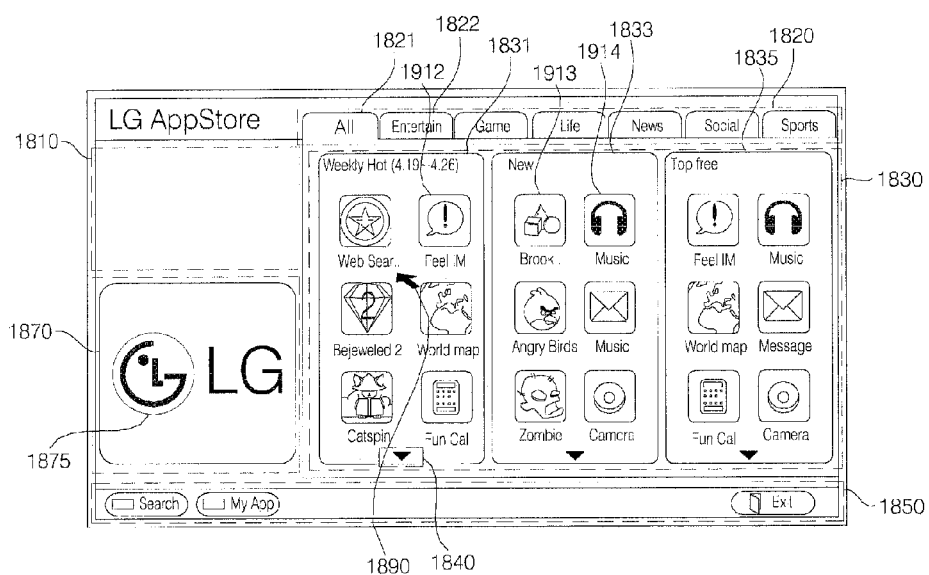

While in FIG. 33, the broadcast image 1811 is displayed in a part of the display 180, an AppStore screen may be displayed free of any broadcast image as illustrated in FIG. 34.

All or part of the embodiments illustrated in FIGS. 20 to 31 may be selectively combined with the method for operating an image display apparatus as described with reference to FIGS. 32, 33 and 34.

As is apparent from the above description, a variety of applications are displayed along with a broadcast image. Therefore, user convenience is increased. Further, applications are classified according to predetermined criteria when they are displayed, thereby enabling the user to more readily identify the applications.

The image display apparatus and the method for operating the same according to the foregoing exemplary embodiments are not restricted to the exemplary embodiments set forth herein.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner.

Examples of the computer-readable recording medium include a ROM, a RAM, a CD-ROM, a magnetic tape, a floppy disc, an optical data memory, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

One or more embodiments described herein provide an image display apparatus and a method for operating the same, which can increase user convenience and provide various user interfaces.

One or more embodiments described herein also provide an image display apparatus and a method for operating the same, which enable downloading and execution of various applications.

In accordance one embodiment, a method for operating an image display apparatus includes displaying a broadcast image, displaying icons representing a plurality of applications in a plurality of card objects, and displaying, when one of the icons is focused on, information about an application corresponding to the focused icon.

In accordance with another embodiment, a method for operating an image display apparatus includes displaying a broadcast image in a first area, displaying tab menus representing categories into which a plurality of applications are classified, in a second area, displaying, upon selection of one of the tab menus, icons representing applications that fall into a category corresponding to the selected tab menu in a plurality of card objects, and displaying a predetermined image in a third area.

In accordance with another embodiment, a multifunctional display device comprises a tuner configured to tune to a channel of a broadcast signal; a network interface configured to receive data packets; a display module; a wireless input interface to receive signals from a remote controller; a storage device to store data; a processor to control the display module based on at least one of broadcast signal, data packets or signals from the remote controller.

A first area of the display module displays a program received through a channel of the broadcast signal tuned by the tuner, and a second area of the display module displays a plurality of card objects. Each card object has a plurality of downloadable applications which fall within at least one prescribed category. Based on a cursor location over a prescribed downloadable application among the plurality of downloadable application, the prescribed downloadable application is highlighted in a prescribed color.

A third area of the display module displays additional information of the prescribed downloadable application. In addition, the third area may be highlighted in with the same color as the prescribed color.

In addition, an indicator is displayed to indicate that additional card objects not shown in the second area are available for display. The additional card objects are displayed based on a flicking signal to move the displayed card objects in a predetermined direction. The flicking signal is generated by the remote controller.

In addition, the second area includes a plurality of regions corresponding to respective ones of the card objects, each region including one or more icons corresponding to a plurality of downloadable applications, and at least one indicator displayed to indicate that at least one of the regions includes additional icons not currently displayed. The additional icons are displayed when a signal is received to move additional icons into the region associated with the indicator, and the signal is generated by the remote controller.

In addition, a fourth area is displayed to include tabs identifying a respective number of categories, a plurality of card objects corresponding to each category. Also, a search area is displayed to allow a search to be conducted for content relating to the card objects, and the additional information displayed in the third area includes a price for allowing a user to buy the downloadable application.

In addition, an option is displayed to allow a user to buy the downloadable application. The first card object corresponds to a plurality of channels; a second card object corresponds to network content; a third card object corresponds to external device connections; a fourth card object corresponds to phone features; and a fifth card object corresponds to games.

In addition, one or more screen shots are displayed corresponding to the highlighted downloadable application. The one or more screen shots are displayed in the third area with the additional information. Also, a swipe signal is received from the remote controller, the swipe signal causes a cursor on a screen to move, and positions of the card objects displayed in the second area move based on movement of the cursor.

In accordance with another embodiment, a multifunctional display device comprises a display module, a storage device to store information, a network interface to receive data packets, a tuner to tune to a channel of a broadcast signal, a wireless interface to receive signals from a remote controller, a processor to control the display module based on at least one of the broadcast signal, data packets or signals from the remote controller.

The first area displays content based on the broadcast signal or data packets, a second area displays a plurality of card objects and one or more downloadable applications for each card object, the downloadable applications displayed with respective ones of the card objects; and a third area displays additional information corresponding to a selected one of the downloadable applications. Positions of the card objects are changed when a signal is received indicating that additional card objects are to be displayed in the second area, the signal is received as a position signal from the remote controller, and an indicator is displayed indicating that the additional card objects are available for display.

In addition, displayed information corresponding to the selected downloadable application is changed based on the selection, and the displayed information corresponding to the selected downloadable application is highlighted in a predetermined color and wherein at least the additional information in the third area is highlighted. The additional information in the third area is highlighted with the predetermined color when the selection is made.

In any of the aforementioned embodiments, additional card objects may be displayed in response to a shift command received from the remote controller. The shift command may move the displayed card objects in a predetermined direction, and one or more hidden card objects are displayed in response to movement of the displayed card objects in the predetermined direction.

The terms "module" and "unit" used to signify components are used herein to help the understanding of the components and thus they should not be considered as having specific meanings or roles. Accordingly, the terms "module" and "unit" may be used interchangeably.

In accordance with one or more embodiments, the image display apparatus is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS). Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of any other embodiment.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multifunctional display device, comprising:
a tuner configured to tune to a channel of a broadcast signal;
a network interface configured to receive data packets;
a display module;
a wireless input interface to receive signals from a remote controller;
a storage device to store data;
a processor to control the display module based on at least one of broadcast signal, data packets or signals from the remote controller, wherein:
a first area of the display module displays a program received through a channel of the broadcast signal tuned by the tuner,
a second area of the display module displaying category tabs identifying a respective number of categories, a plurality of card objects corresponding to a category of a selected category tab, wherein applications that fall into the category corresponding to the selected category tab are re-classified, and the re-classified applications are displayed in corresponding card objects, and
a third area of the display module displays an advertisement image,
wherein when one application among the plurality of application is focused based on a cursor location, the advertisement image displayed in the third area is replaced with additional information related to the focused application, and
wherein the first area, the second area and the third area of the display module are different display areas on the display.

2. The device of claim 1, wherein additional card objects are displayed in response to a shift command received from the remote controller.

3. The device of claim 2, wherein the shift command is to move the displayed card objects in a predetermined direction.

4. The device of claim 3, wherein one or more hidden card objects are displayed in response to movement of the displayed card objects in the predetermined direction.

5. The device of claim 1, wherein:
the second area includes a plurality of regions corresponding to respective ones of the card objects,
each region including one or more icons corresponding to a plurality of downloadable applications, and at least one indicator displayed to indicate that at least one of the regions includes additional icons not currently displayed.

6. The device of claim 5, wherein the additional icons are displayed when a signal is received to move additional icons into the region associated with the indicator.

7. The device of claim 6, wherein the signal is generated by the remote controller.

8. The device of claim 1, wherein:
a search area is displayed to allow a search to be conducted for content relating to the card objects.

9. The device of claim 1, wherein the additional information displayed in the third area includes a price for allowing a user to buy the downloadable application.

10. The device of claim 1, wherein:
an option is displayed to allow a user to buy the downloadable application.

11. The device of claim 1, wherein:
one or more screen shots are displayed corresponding to the highlighted downloadable application.

12. The device of claim 11, wherein the one or more screen shots are displayed in the third area with the additional information.

13. The device of claim 1, wherein:
a swipe signal is received from the remote controller,
the swipe signal causes a cursor on a screen to move, and
positions of the card objects displayed in the second area move based on movement of the cursor.

14. The device of claim 1, wherein the focused application is highlighted in a prescribed color.

15. The device of claim 14, wherein the third area is highlighted in with the same color as the prescribed color.

16. The device of claim 1, wherein the cursor location is based on a signal from the remote controller.

17. The device of claim 1, wherein the specific advertisement image is received over a network or through a connected external device.

18. The device of claim 1, wherein a stored image in the multifunctional display device is displayed when a signal for an advertisement is not received.

19. The device of claim 1, wherein a default category is selected when a selection for one category among the category tabs is not received.

20. The device of claim 1, wherein the first area, the second area and the third area of the display module are displayed concurrently, each in a different region of a display area that do not overlap each other.

* * * * *